US012637225B1

(12) United States Patent
Tang et al.

(10) Patent No.: US 12,637,225 B1
(45) Date of Patent: May 26, 2026

(54) SYSTEM AND METHOD FOR MANAGING ELECTRIC MOTOR PROPULSION COMMAND LIMITS ON A HYBRID ROTORCRAFT

(71) Applicant: Pratt & Whitney Canada Corp., Longueuil (CA)

(72) Inventors: Poi Loon Tang, Coquitlam (CA); Xuening Lu, Oakville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/190,201

(22) Filed: Apr. 25, 2025

(51) Int. Cl.
| | |
|---|---|
| *B64D 31/18* | (2024.01) |
| *B64C 27/12* | (2006.01) |
| *B64D 27/02* | (2006.01) |
| *B64D 27/33* | (2024.01) |

(52) U.S. Cl.
CPC ........... *B64D 31/18* (2024.01); *B64D 27/026* (2024.01); *B64D 27/33* (2024.01); *B64C 27/12* (2013.01); *F05D 2270/053* (2013.01)

(58) Field of Classification Search
CPC ...... B64D 31/18; B64D 27/026; B64D 27/33; B64C 27/12; F05D 2270/053
See application file for complete search history.

(56) References Cited

U.S. PATENT DOCUMENTS

| | | |
|---|---|---|
| 5,020,316 A | 6/1991 | Sweet et al. |
| 5,303,142 A | 4/1994 | Parsons |

| | | |
|---|---|---|
| 9,008,942 B2 | 4/2015 | Dyrla et al. |
| 9,051,881 B2 | 6/2015 | Bettner |
| 10,006,375 B1 | 6/2018 | Wagner et al. |
| 10,040,566 B2 | 8/2018 | Waltner |
| 10,196,923 B2 | 2/2019 | Thomassin |
| 10,364,037 B2 | 7/2019 | Armstrong et al. |
| 10,472,078 B2 | 11/2019 | Huang |
| 10,641,184 B2 | 5/2020 | Wulff et al. |
| 10,661,911 B2 | 5/2020 | Armstrong et al. |

(Continued)

FOREIGN PATENT DOCUMENTS

| | | | | |
|---|---|---|---|---|
| EP | 3162713 A1 * | 5/2017 | ............. | B64D 27/10 |
| WO | 2023041382 A1 | 3/2023 | | |
| WO | 2024235979 A1 | 11/2024 | | |

OTHER PUBLICATIONS

Non-Final Office Action issued Apr. 13, 2026, in connection with U.S. Appl. No. 19/197,808, 22 pages.

*Primary Examiner* — Matthew T Largi

(57) ABSTRACT

A method includes receiving a torque load demand associated with a rotor, and a gas-turbine engine (GTE) power measurement among first measurements from a GTE. The method includes determining whether the torque load demand is within operating limits of the GTE without assistance from a motor, based on the first measurements compared to a condition for operating in an assisted mode. The method includes generating a first command signal that sets a motor torque limit, and a second command signal that sets a motor speed reference value based on a difference between the torque load demand and the GTE power measurement. The method includes setting or reducing the motor torque limit to a low value when the condition for operating in the assisted mode is not satisfied, and increasing the motor torque limit to a high value when the condition for operating in the assisted mode is satisfied.

20 Claims, 16 Drawing Sheets

(56)        References Cited

U.S. PATENT DOCUMENTS

| 10,800,536 | B2 * | 10/2020 | Wagner | F02C 6/206 |
|---|---|---|---|---|
| 11,428,171 | B2 | 8/2022 | Brown et al. | |
| 11,466,626 | B2 | 10/2022 | Djelassi | |
| 11,480,112 | B2 | 10/2022 | Whatley | |
| 11,585,283 | B2 | 2/2023 | Steinert | |
| 11,597,526 | B2 | 3/2023 | Mark et al. | |
| 11,652,428 | B2 | 5/2023 | Hon et al. | |
| 11,713,129 | B2 | 8/2023 | Thomassin et al. | |
| 11,725,594 | B2 | 8/2023 | McQuiston et al. | |
| 11,794,917 | B2 | 10/2023 | Guerchkovitch et al. | |
| 11,939,073 | B2 * | 3/2024 | Imel | B64D 41/00 |
| 11,988,159 | B2 | 5/2024 | Detweiler et al. | |
| 11,999,495 | B2 | 6/2024 | Thomassin et al. | |
| 12,030,662 | B2 | 7/2024 | Thiriet et al. | |
| 12,043,374 | B2 * | 7/2024 | Hettenkofer | B64D 31/18 |
| 12,208,912 | B2 | 1/2025 | Thiriet et al. | |
| 12,240,619 | B2 | 3/2025 | Thomassin et al. | |
| 12,252,264 | B2 | 3/2025 | Guerchkovitch et al. | |
| 12,263,953 | B2 | 4/2025 | Freer | |
| 12,296,941 | B2 | 5/2025 | Freer | |
| 12,391,392 | B1 | 8/2025 | Lu et al. | |
| 2009/0153087 | A1 | 6/2009 | Lim | |
| 2016/0368471 | A1 | 12/2016 | Cho | |
| 2017/0008505 | A1 | 1/2017 | Park | |
| 2018/0178908 | A1 * | 6/2018 | Taheri | B64C 27/12 |
| 2019/0322382 | A1 * | 10/2019 | Mackin | B64D 35/024 |
| 2020/0140106 | A1 * | 5/2020 | Dougherty | B64D 27/33 |
| 2021/0237887 | A1 | 8/2021 | Besse et al. | |
| 2023/0011896 | A1 * | 1/2023 | Serr | B64D 35/023 |
| 2023/0080296 | A1 * | 3/2023 | Na | B60W 40/09 |
| | | | | 701/70 |
| 2023/0312115 | A1 | 10/2023 | Alecu | |
| 2024/0017823 | A1 * | 1/2024 | Parsons | B64D 35/08 |
| 2025/0197018 | A1 | 6/2025 | Freer | |

* cited by examiner

FIG. 3 (CONTINUED)

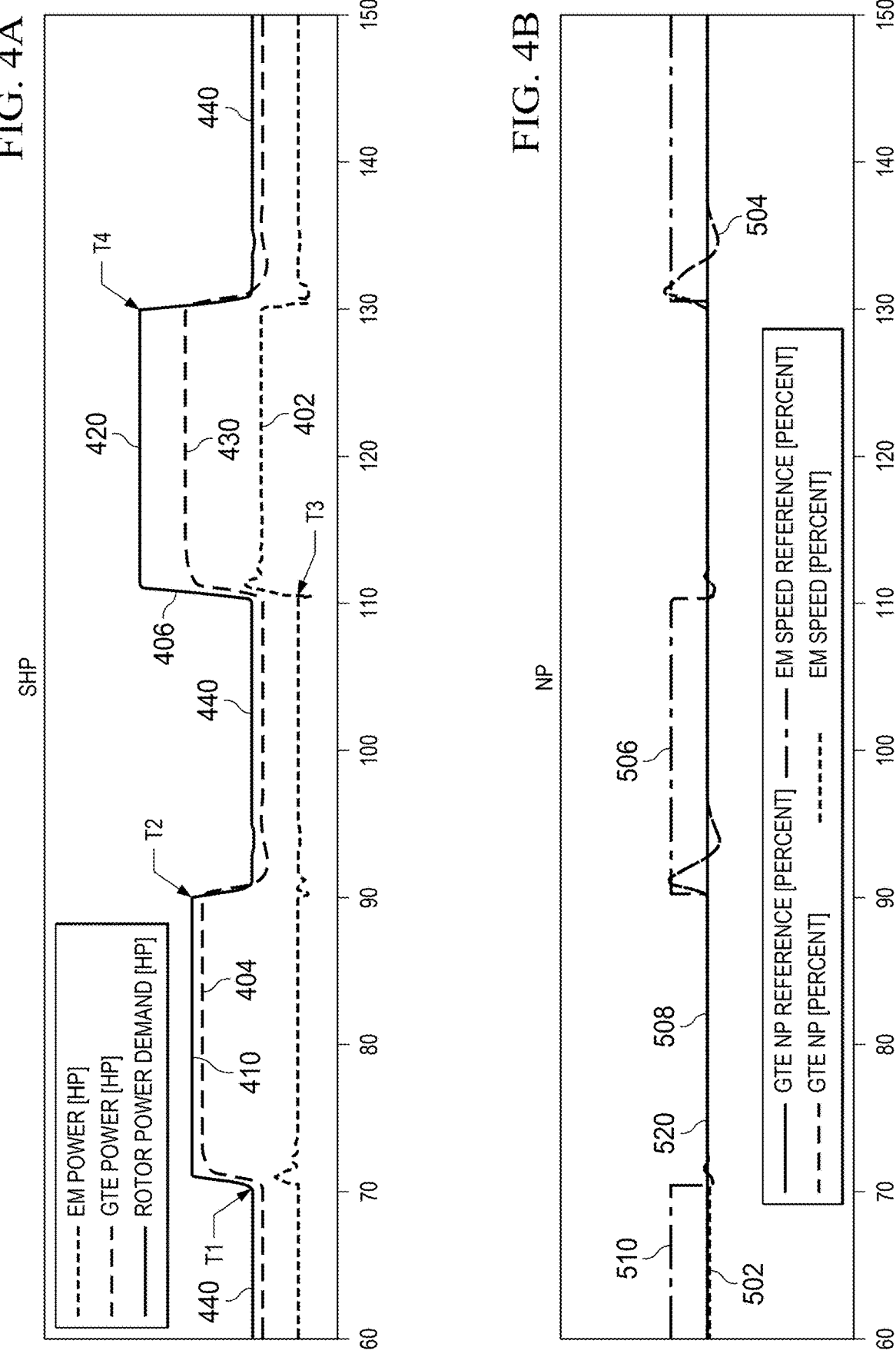

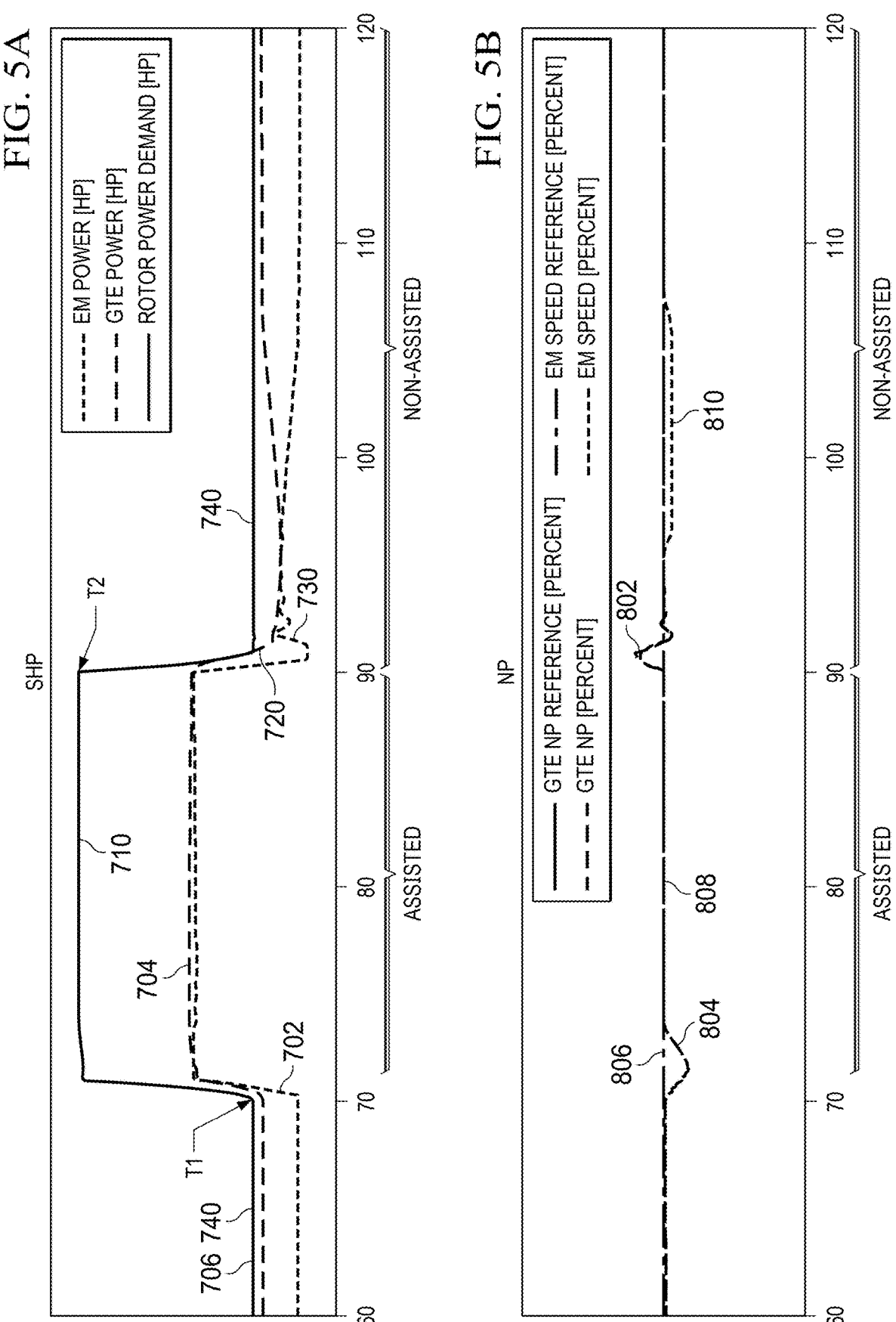

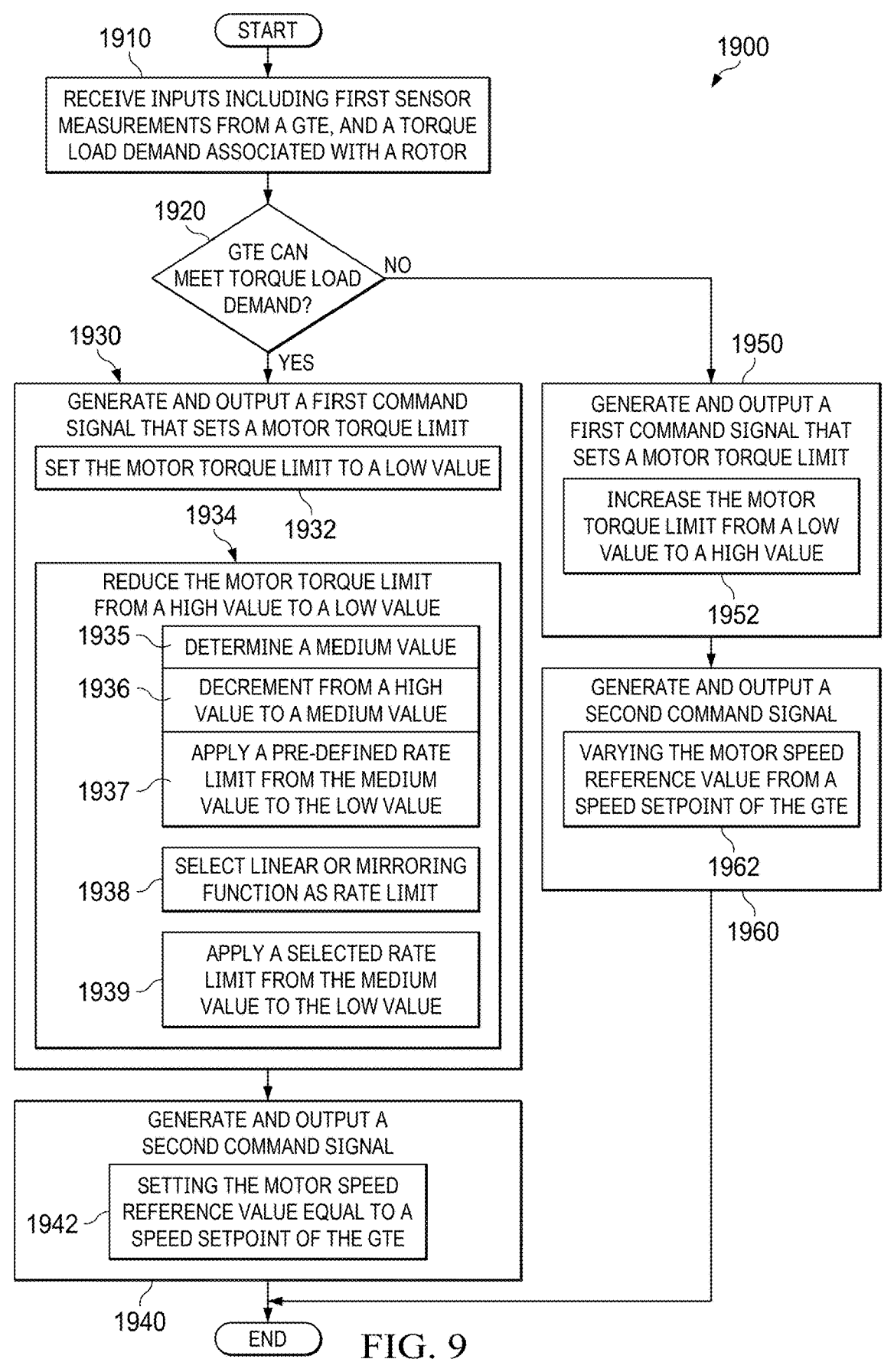

1910

START

1900

RECEIVE INPUTS INCLUDING FIRST SENSOR MEASUREMENTS FROM A GTE, AND A TORQUE LOAD DEMAND ASSOCIATED WITH A ROTOR

1920

GTE CAN MEET TORQUE LOAD DEMAND?

NO

YES

1930

GENERATE AND OUTPUT A FIRST COMMAND SIGNAL THAT SETS A MOTOR TORQUE LIMIT

SET THE MOTOR TORQUE LIMIT TO A LOW VALUE

1934

1932

REDUCE THE MOTOR TORQUE LIMIT FROM A HIGH VALUE TO A LOW VALUE

1935 — DETERMINE A MEDIUM VALUE

1936 — DECREMENT FROM A HIGH VALUE TO A MEDIUM VALUE

1937 — APPLY A PRE-DEFINED RATE LIMIT FROM THE MEDIUM VALUE TO THE LOW VALUE

1938 — SELECT LINEAR OR MIRRORING FUNCTION AS RATE LIMIT

1939 — APPLY A SELECTED RATE LIMIT FROM THE MEDIUM VALUE TO THE LOW VALUE

GENERATE AND OUTPUT A SECOND COMMAND SIGNAL

1942 — SETTING THE MOTOR SPEED REFERENCE VALUE EQUAL TO A SPEED SETPOINT OF THE GTE

1940

1950

GENERATE AND OUTPUT A FIRST COMMAND SIGNAL THAT SETS A MOTOR TORQUE LIMIT

INCREASE THE MOTOR TORQUE LIMIT FROM A LOW VALUE TO A HIGH VALUE

1952

GENERATE AND OUTPUT A SECOND COMMAND SIGNAL

VARYING THE MOTOR SPEED REFERENCE VALUE FROM A SPEED SETPOINT OF THE GTE

1962

1960

END

FIG. 9

SYSTEM AND METHOD FOR MANAGING ELECTRIC MOTOR PROPULSION COMMAND LIMITS ON A HYBRID ROTORCRAFT

TECHNICAL FIELD

This disclosure relates generally to aircraft. More specifically, this disclosure relates to a system and method for managing electric motor propulsion command limits on a hybrid rotorcraft.

BACKGROUND

Traditional multi-engine rotorcrafts (such as helicopters) are powered by thermal engines (also referred to as gas-turbine powerplants) which are connected to the rotor system of the rotorcraft via a main gearbox. Rotor speed is maintained by modulating fuel flow of the gas-turbine powerplants. In a hybrid rotorcraft, one or more of the gas-turbine powerplants are replaced by one or more electric motors.

SUMMARY

This disclosure relates to a system and method for managing electric motor propulsion command limits on a hybrid rotorcraft.

In some examples, a method for managing electric motor propulsion command limits on a hybrid rotorcraft is provided. The method includes receiving a torque load demand associated with a rotor, and a gas-turbine engine (GTE) power measurement among first measurements from a GTE. The method includes determining whether the torque load demand is within operating limits of the GTE without assistance from a motor, based on the first measurements compared to a condition for operating in an assisted mode. The method includes generating and outputting a first command signal that sets a motor torque limit, and a second command signal that sets a motor speed reference value based on a difference between the torque load demand and the GTE power measurement. Generating the first and second command signals includes setting or reducing the motor torque limit to a low value, in response to a determination that the condition for operating in the assisted mode is not satisfied. Generating the first and second command signals further includes increasing the motor torque limit to a high value, in response to a determination that the condition for operating in the assisted mode is satisfied.

In some examples, an electronic device for managing electric motor propulsion command limits on a hybrid rotorcraft is provided. The electronic device may include at least one processor. The at least one processor may be configured to receive a torque load demand associated with a rotor, and a gas-turbine engine (GTE) power measurement among first measurements from a GTE. The at least one processor may be configured to determine whether the torque load demand is within operating limits of the GTE without assistance from a motor, based on the first measurements compared to a condition for operating in an assisted mode. The at least one processor may be configured to generate and output a first command signal that sets a motor torque limit, and a second command signal that sets a motor speed reference value based on a difference between the torque load demand and the GTE power measurement. To generating the first and second command signals, the at least one processor may be configured to set or reduce the motor torque limit to a low value, in response to a determination that the condition for operating in the assisted mode is not satisfied. To generating the first and second command signals, the at least one processor may be configured to increase the motor torque limit to a high value, in response to a determination that the condition for operating in the assisted mode is satisfied.

Any single one or any combination of the following features may be used with any of the above examples. In some examples, a determination that the condition for operating in the assisted mode is satisfied is based on the torque load demand exceeding a steady-state operating limit of the engine or a rate of change of the torque load demand exceeding a transient operating limit of the engine.

In some examples, a determination that the condition for operating in the assisted mode is not satisfied is based on: the torque load demand not exceeding a steady-state operating limit of the engine; and a rate of change of the torque load demand exceeding a transient operating limit of the engine.

In some examples, to generate the first command signal, a procedure to reduce the motor torque limit to the low value includes: decrementing the motor torque limit from the high value to a medium value at an instantaneous rate; and reducing the motor torque limit from the medium value to the low value at a non-instantaneous rate that is based on pre-defined rate limit.

In some examples, the medium value is determined as a motor torque measurement at a time of satisfying a condition in which a torque difference between the motor torque measurement and a GTE torque measurement is within a threshold.

In some examples, the medium value is determined as a motor torque measurement at a time of satisfying a condition in which an increase of the motor torque measurement stops.

In some examples, a first motor torque measurement is determined at a time that a motor torque measurement and GTE torque measurement are equal to each other. The medium value is determined as a multiple of the first motor torque measurement.

In some examples, the non-instantaneous rate is determined as a selection of a greater from among the pre-defined rate limit and an augmenting torque limit. The augmenting torque limit is an inverse of a GTE torque measurement.

In some examples, a procedure to generate the second command signal includes: setting the motor speed reference value equal to a speed setpoint of the GTE that is based on the difference between the torque load demand and the GTE power measurement, in response to a determination that the condition for operating in the assisted mode is not satisfied. The procedure to generate the second command signal includes: varying the motor speed reference value from the speed setpoint of the GTE, in response to a determination that the condition for operating in the assisted mode is satisfied.

In some examples, the low value of the motor torque limit is great enough to maintain a minimum limit of electric motor rotor speed and while not reducing a state of change of a battery that provides power to the electric motor.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 4A, 4B, and 4C respectively illustrate power, speed, and torque responses relative to a period of time during a first simulation of the system of FIG. 3;

FIGS. 5A, 5B, and 5C respectively illustrate power, speed, and torque responses relative to a period of time during a second simulation of the system of FIG. 3;

FIG. 9 illustrates a method for managing electric motor propulsion command limits on a hybrid rotorcraft in accordance with this disclosure.

DETAILED DESCRIPTION

FIGS. 1 through 9, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

Figure 1:
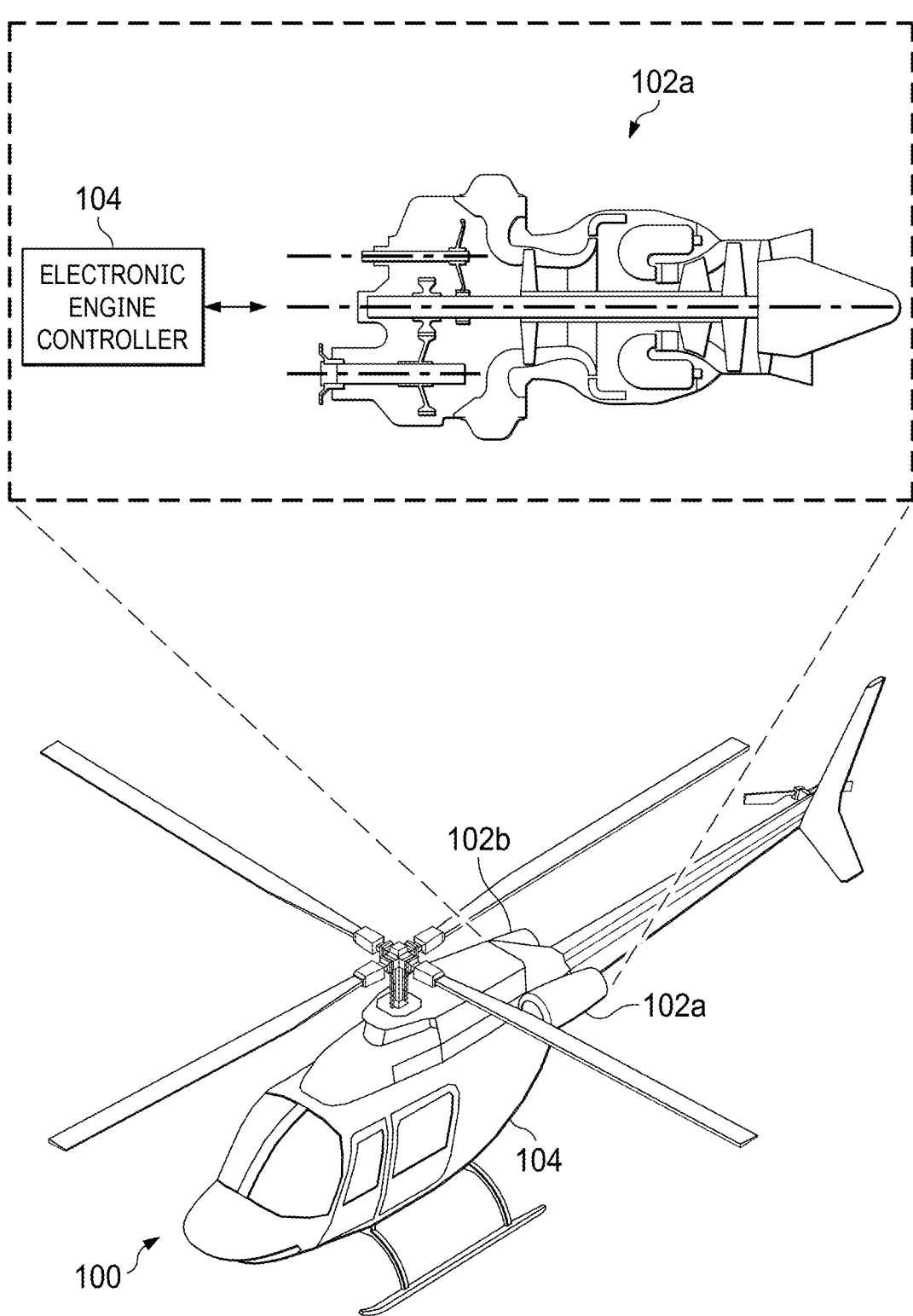
FIG. 1 illustrates an example aircraft supporting systems and methods for managing electric motor propulsion command limits on a hybrid rotorcraft in accordance with this disclosure.

FIG. 1 illustrates an example aircraft 100 supporting systems and methods for managing electric motor propulsion command limits on a hybrid rotorcraft in accordance with this disclosure. As shown in FIG. 1, the aircraft 100 represents a helicopter having multiple engines 102a-102b, where at least one engine 102a is positioned on one side of the aircraft 100 and at least one engine 102b is positioned on the opposite side of the aircraft 100. Note that the form of the aircraft 100 shown in FIG. 1 is for illustration only and that the aircraft 100 may have any other suitable form. In the case that the aircraft is a helicopter, these gas-turbine engines 1021-102b can be turboshaft engines. As another example, while the aircraft 100 in this example has two engines 102a-102b, the aircraft 100 may have any other numbers of engines, such as when two or more engines are positioned on different sides of the aircraft 100.

As described in more detail below, the engines 102a-102b can be associated with an electronic engine control (EEC) system or a flight management system (FMS) (EEC/FMS) 104 of the aircraft 100. The EEC/FMS 104 may be implemented using one or more processing devices, such as one or more microprocessors, microcontrollers, digital signal processors (DSPs), application specific integrated circuits (ASICs), field programmable gate arrays (FPGAs), or discrete circuitry. This disclosure does not limit the EEC/FMS

104 to any particular type of device or system. In some embodiments, the EEC/FMS 104 may include or implement systems and methods for managing electric motor propulsion command limits on a hybrid rotorcraft, such as one or more the engines 102a-102b. More particularly, the EEC/FMS 104 may include or implement an EEC power/torque management system (referred to herein as PT manager) for managing electric motor propulsion command limits on a hybrid rotorcraft, such as one or more the engines 102a-102b.

Although FIG. 1 illustrates one example of an aircraft 100 supporting systems and methods for managing electric motor propulsion command limits on a hybrid rotorcraft, various changes may be made to FIG. 1. For example, as noted above, the form of the aircraft 100 and the positions of the engines 102a-102b on the aircraft 100 can vary depending on the implementation. Also, any suitable system or subsystem of the aircraft 100 may benefit from or use the disclosed techniques for managing electric motor propulsion command limits on a hybrid rotorcraft. As a particular example, the aircraft 100 can be a hybrid rotorcraft in which one or more or more of the engines 102a-102b is replaced by one or more electric motors.

Figure 2:
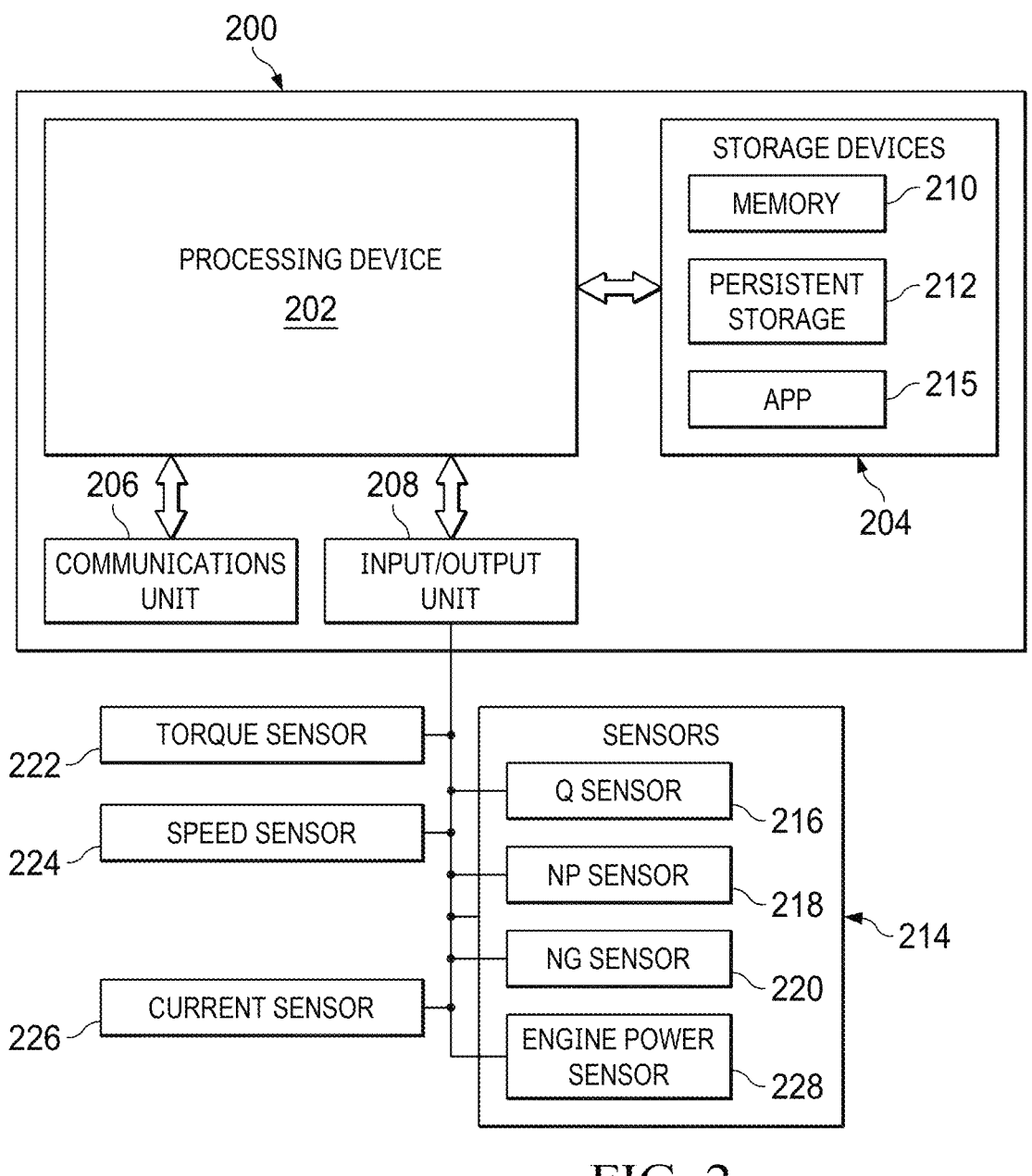
FIG. 2 illustrates an example computing system supporting systems and methods for managing electric motor propulsion command limits on a hybrid rotorcraft in accordance with this disclosure.

FIG. 2 illustrates an example computing system 200 supporting systems and methods for managing electric motor propulsion command limits on a hybrid rotorcraft in accordance with this disclosure.

As shown in FIG. 2, the computing system 200 may include at least one processing device 202, at least one optional storage device 204, at least one communications unit 206, and at least one optional input/output (I/O) unit 208. The processing device 202 may execute instructions that can be loaded into a memory 210 or other location that is local to the processing device 202. The processing device 202 includes any suitable number(s) and type(s) of processors or other processing devices in any suitable arrangement. Example types of processing devices 202 include one or more microprocessors, microcontrollers, digital signal processors (DSPs), ASICs, FPGAs, or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. The communications unit 206 may support communications through any suitable physical or wireless communication link(s), such as a network or dedicated connection(s).

The I/O unit 208 allows for input and output of data. For example, the I/O unit 208 may provide a connection for user input through a keyboard, mouse, keypad, touchscreen, or other suitable input device. The I/O unit 208 may also send output to a display or other suitable output device. Note, however, that the I/O unit 208 may be omitted if the computing system 200 does not require local I/O, such as when the computing system 200 represents a server or other component that can be accessed remotely over a network.

Although FIG. 2 illustrates one example of a computing system 200 supporting systems and methods for managing electric motor propulsion command limits on a hybrid rotorcraft according to this disclosure, various changes may be made to FIG. 2. For example, computing devices and systems come in a wide variety of configurations, and FIG. 2 does not limit the PT manager to any particular computing device or system. For example, the computing system 200 can be the EEC/FMS 104 of FIG. 1. As another example, the I/O unit 208 can connect to external devices (external to the computing system 200), such as sensors 214 that measure fuel flow (Wf), compressor section exit pressure (P3), speed, and power of the gas-turbine engine. As yet another example, the storage device 204 can store an application 215 that, when executed, enables the computing system 200 to perform the functions of the systems and methods for managing electric motor propulsion command limits on a hybrid rotorcraft as described in this disclosure. In some embodiments, the sensors 214 can include a torque sensor (Q sensor) 216, a power turbine sensor (Np sensor) 218 that measures rotor speed and is coupled to the rotor, and an Ng sensor 220. In some embodiments, the Np sensor 218 measures the rotation speed of a power turbine of the engine, and the Ng sensor 220 measures rotation speed of the compressor section of the engine. In some embodiments, the I/O unit 208 can connect to sensors 222, 224, 226 that measure torque, speed, and current of an electric motor. In some embodiments, the sensors 214 can include a sensor 228 that measures gas-turbine engine power.

Figure 3:
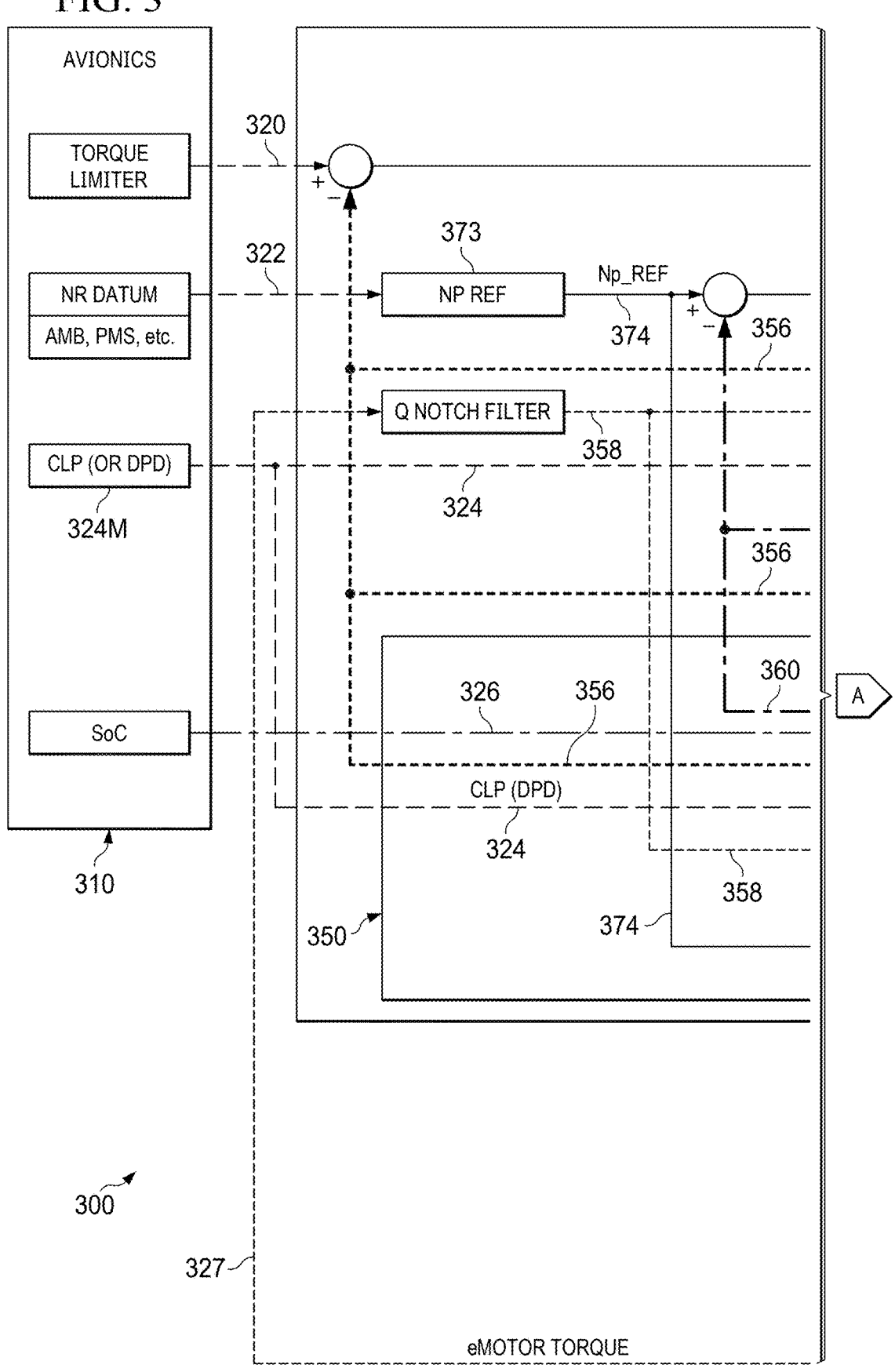
FIG. 3 illustrates an example architecture of a variable torque limit control system in accordance with embodiments of this disclosure.
Figure 3:
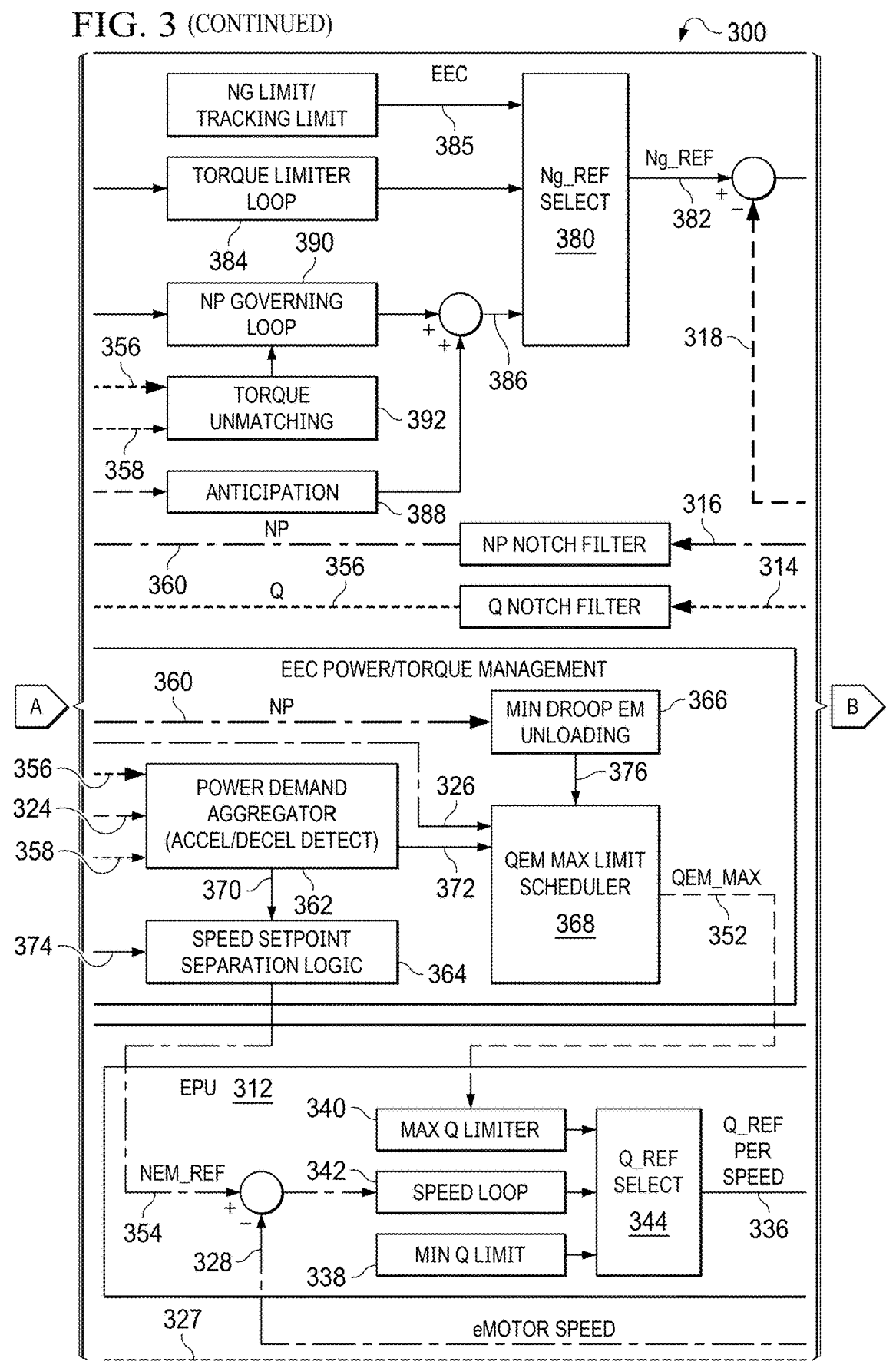

FIG. 3 illustrates an example architecture of a variable torque limit control system 300 in accordance with embodiments of this disclosure. The system 300 is a solution to a problem that a set of one or more gas-turbine engines of an aircraft can be unable to meet the demand (namely, torque load demand) from the rotor when saturation of the set of engines occurs. An engine that is outputting its maximum power output is in saturation, which can occur during steady state operations or transiently during a fast maneuver. The system 300 controls electric motor(s) to provide additional power to the rotor to assist the engine(s).

Traditionally, speed loops of motors are independent of speed loops of the engine. As a technical solution, the system 300 makes speed loops of motors coordinated with speed loops of the engine. This disclosure describes the techniques to manage the power or torque of the electric motors 306. This disclosure provides details of managing the amount of allowed torque (or allowed power) demand from the speed governor of the electric motors.

The system 300 includes one or more gas-turbine engines 302, an EEC 304, one or more electric motors 306, a rotor drivetrain 308, avionics 310, and an electric propulsion unit (EPU or motor controller) 312. For simplicity, the engine 302 refers to the one or more gas-turbine engines 302 as a set, or refers to a respective engine from among the set. Analogously, the motor 306 refers to a respective motor from among a set of motors 306 or to the set itself. The engine 302 can represent the one or more gas-turbine engines 102a-102b of FIG. 1. The engine 302 can include some of the sensors 214 of FIG. 2, such as the torque sensor 216 that generates an engine torque measurement 314, the power turbine sensor 218 that generates a rotor speed measurement 316, and the Ng sensor 220 that generates a feedback measurement 318. The EEC 304 can represent the EEC/FMS 104 of FIG. 1. The EEC 304 can represent the computing system 200 of FIG. 2, in which case the I/O unit 208 can connect to external devices such as the engines 302, the avionics 310, the EPU 312, and sensors that measure performance of the motor 306.

The EEC 304 receives input measurements 314, 316, 318 from the engine 302. The EEC 304 receives inputs from the avionics 310, including a torque limit 320, a rotor speed (NR) datum 322, digital power demand (DPD) and collective lever pitch (CLP) data 324, and state of charge (SoC) data 326 of a battery (not shown) that provides electric energy to the motor 306. Datum is synonymous to reference. As inputs from the avionics 310, the EEC 304 receives other input measurements (illustrated as "AMB, PMS, etc.") that can include an NR speed data, ambient conditions data including but not limited to temperature and pressure, power management switch (PMS) data. The PMS selects the state of the engine 302, such as the ON, OFF, IDLE, or FLYING-SPEED states, etcetera, and the PMS data can include the PMS-selected state.

The DPD and CLP data 324 is referred to as CLP data 324, for simplicity in this disclosure. The pilot of the aircraft controls (for example, manually) a collective lever to increase or decrease the lift generated by the rotor to ascend, descend or cruise. Movement of this lever pitch angle changes the rotor blades angle, which is measured by a CLP module 324m. In some embodiments, the CLP module 324m maps such measurements of the CLP angle to a torque demand. The CLP module 324m can map using a look-up table or using a pre-determined load map function. The CLP data 324 can include a measurement of CLP angle and/or a torque demand value mapped to the CLP angle. In some embodiments, the CLP module 324m determines rotor load torque as a function of the CLP angle. In this disclosure, rotor load torque is also referred to as torque demand or as rotor torque demand. Given that power is a function (for example, multiplication product) of torque and angular velocity, the CLP module 324m, in some embodiments, determines a rotor power demand based on the CLP angle. The CLP data 324 can include the rotor power demand.

As input from the motor 306, the EEC 304 receives a measurement 327 from a torque sensor that measures torque output from the electric motor 306. For example, the motor 306 can include some of the sensors 214 of FIG. 2, such as the torque sensor 222 that generates the motor torque measurement 327, the speed sensor 224 that generates a motor speed measurement 329, and the motor current sensor 226 that generates a motor current measurement 329.

The speed of the rotor drivetrain 308 system is governed (for example, controlled or limited) by the gas-turbine engines 302 and electric motors 306. The engines 302 maintain rotor speed (at an approximately constant speed, for example, within a threshold range of the constant speed) by modulating fuel flow using the EEC 304, while the electric motors 306 maintain rotor speed by modulating current using the EPU 312. That is, the EEC 304 includes an inner control loop in which a fuel flow selector 330 modulates (for example, selects) the fuel flow of the engine 302 by outputting a fuel flow selection (WF_SEL) 332 to the engine 302.

Analogously, the EPU 312 includes an inner control loop in which current commands 334 to the electric motors 306 are modulated by an outer speed control loop that generates torque command 336 (illustrated as Q_REF PER SPEED) that gets converted to the current command 334. The torque command 336 is limited by minimum and maximum limits 338 and 340. The torque command 336 is selected based in part on a speed loop selection value 342, and a saturation module 344 that prevents the electric motor speed loop from setting the torque command 336 to a value below the minimum limit 338 or above the maximum limit 340. A converter 346 converts torque to current, for example, converting the torque command 336 to a reference current (I_REF) 348.

In this disclosure, an EEC power/torque management module (PT manager) 350 executes methods to vary the speed loop torque command limits of the electric motors 306 when electric motors assistance is determined to be both needed and available. That is, the PT manager 350 generates and outputs a first command signal 352 (illustrated as QEM_Max) that sets (for example, varies or updates) the value of the maximum limit 340 for the torque command to the electric motors 306, and outputs a second command signal 354 (illustrated as NEM_REF) that modifies a speed loop reference value 342 of the electric motors 306. That is, the maximum limit 340, which can be referred to as maximum torque command limit, is modulated via the PT manager 350. The PT manager 350 can represent the application 215 of FIG. 2. In this disclosure, various examples and schemes are described using torque, which can be replaced with usage of power in one or more instances.

The PT manager 350 actively evaluates to determine when electric motor assistance is required, for example, determining that the engine 302 is saturated by actively evaluating inputs including CLP data 324, SoC data 326, notch-filtered engine torque measurement 356, notch filtered motor torque measurement 358, and notch-filtered rotor speed measurement 360. The PT manager includes a power demand aggregator function (power demand aggregator) 362, a speed setpoint separation logic 364, a min droop EM unloading function 366, and a QEM maximum limit scheduler 368.

The power demand aggregator 362 determines if the engine 302 only (such as without assistance from the motor 306) can meet rotor load. If the power demand aggregator 362 determines that the engine 302 can meet rotor load, then the power demand aggregator 362 generates and outputs control signals 370-372 that control the system 300 to operate in non-assisted mode, but if the power demand aggregator 362 alternatively determines that the engine 302 cannot meet rotor load, then the control signals 370-372 control the system 300 to operate in assisted mode. For example, the output (i.e., control signals 370-372) from the power demand aggregator 362 can be a binary selection, namely one value corresponding to assisted mode or alternatively a different value corresponding to non-assisted mode. The control signal 370 is output to the speed setpoint separation logic 364, and the control signal 372 is output to the QEM maximum limit scheduler 368.

The speed setpoint separation logic 364 receives the control signal 370, selects to execute a pass-through function if the control signal 370 indicates to operate in assisted mode, selects to execute a speed setpoint separation function if the control signal 370 indicates to operate in non-assisted mode, and outputs the second command signal 354. This second command signal 354 can be referred to as a nominal electric motor reference signal (illustrated as NEM_REF). In non-assisted mode, the second command signal 354 is equivalent to the NR datum 322 that the speed setpoint separation logic 364 passed through. In non-assisted mode, the second command signal 354 can be different from NR datum 322, based on the speed setpoint separation function executed. In non-assisted mode, motor speed set point can be set lower or higher than GTE speed setpoint. For example, a data input terminal of the speed setpoint separation logic 364 is connected to an output terminal of an NP REF module 373, and receives NR datum 322 in assisted mode, but receives an elevated speed setpoint reference 374 (illustrated as Np_REF) in non-assisted mode. Typically, the elevated speed setpoint reference 374 is a fixed ratio of NR datum 322. The elevated speed setpoint reference 374 can follow NR datum 322, for example, increasing or decreasing with NR datum 322. The NR datum 322 and Np_REF 373 used by GTE are independent of the assisted/non-assisted mode. Speed setpoint separation logic modifies Np_REF 373 (e.g., via a bias) into NEM_REF 374 into motor speed set point.

The min droop EM unloading function 366 outputs a control signal 376 to the QEM maximum limit scheduler 368. The QEM maximum limit scheduler 368 generates and outputs the first command signal 352 that controls when motor 306 can assist and how much assistance the motor 306 is allowed to provide. When the control signal 372 indicates the non-assisted mode, the QEM maximum limit scheduler 368 outputs the first command signal 352 as a zero value, low value, or negative value. When the control signal 372 indicates the assisted mode, the QEM maximum limit scheduler 368 outputs the first command signal 352 as a high value or a positive medium value.

Other components of the inner control loop in the EEC 304 provide inputs to the fuel flow selector 330, including an ITT limit loop, Ng governing loop, acceleration loop, deceleration loop, and fuel flow minimum/maximum limits. The aforementioned loops can be, but are not limited to, Proportional plus Integral (PI) type. The EEC 304 includes an outer control loop that in which an engine speed reference selector 380 modulates (for example, selects) the speed of the engine 302 by outputting a selected speed (Ng) reference 382 (Ng_REF) to the Ng governing loop. This outer control loop of the EEC 304 includes a torque control loop and a power turbine rotation speed (Np) control loop. The torque control loop provides input to engine speed reference selector 380 via a torque limiter loop 384. The torque limiter loop 384 receives input via a combiner that outputs a difference by subtracting the notch-filtered engine torque measurement 356 from the torque limit 320. The engine speed reference selector 380 also receives an input that is an NG limit/tracking limit 385. The power turbine rotation speed (Np) control loop provides input 386 to engine speed reference selector 380 via an adder that generates a sum of an anticipation 388 and an output from the NP governing loop 390.

The anticipation 388 receives the CLP data 324 from the avionics 310, such as from a CLP module 324m. The NP governing loop 390 receives inputs from a torque unmatching function 392, and from a combiner which subtracts a notch-filtered rotor speed measurement 360 from the speed setpoint reference 374. The speed setpoint reference 374 is not elevated relative to the NP governing loop 390, but instead, the second command signal 354 generated by the Speed Setpoint Separation Logic 364 will be elevated. The torque unmatching function 392 receives inputs including notch-filtered engine torque measurement 356 and notch filtered motor torque measurement 358, and outputs a difference between the torque measurement from the engine 302 and torque measurement from the motor 306. The NP governing loop 390 increases engine power based on difference received from torque unmatching function 392.

Figure 4C:
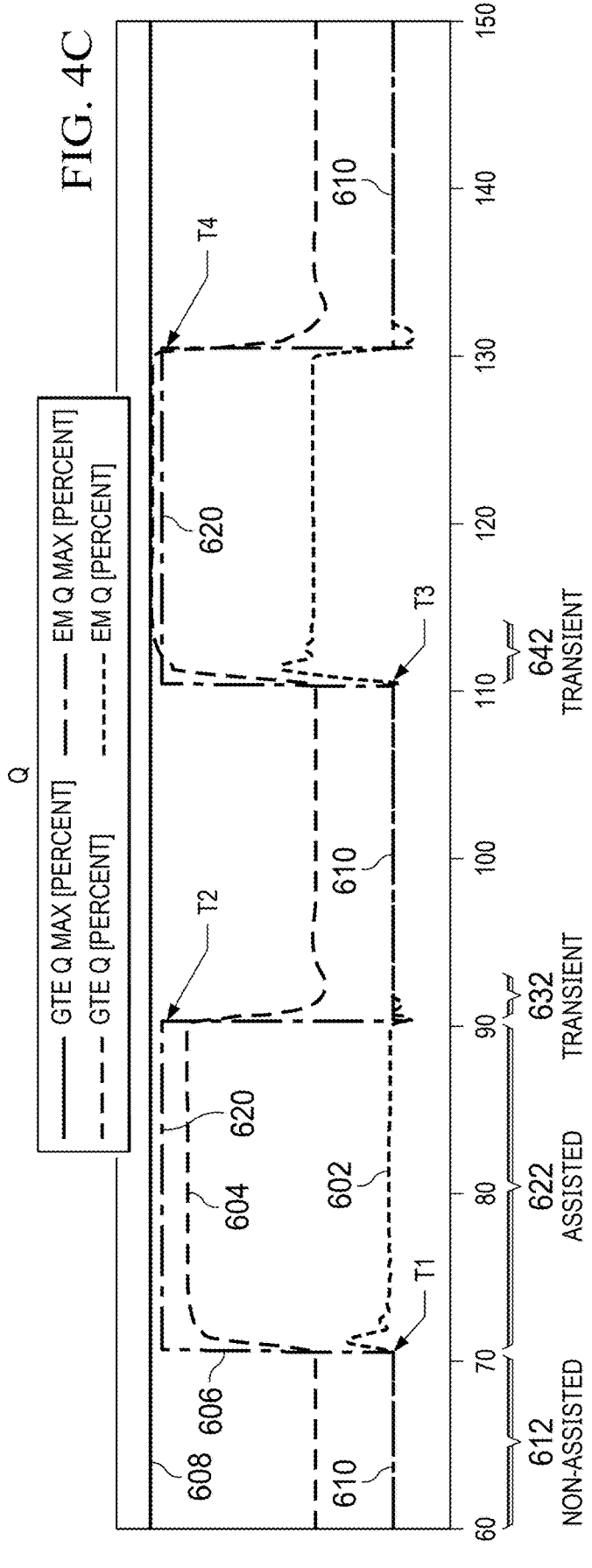
Figure 5C:
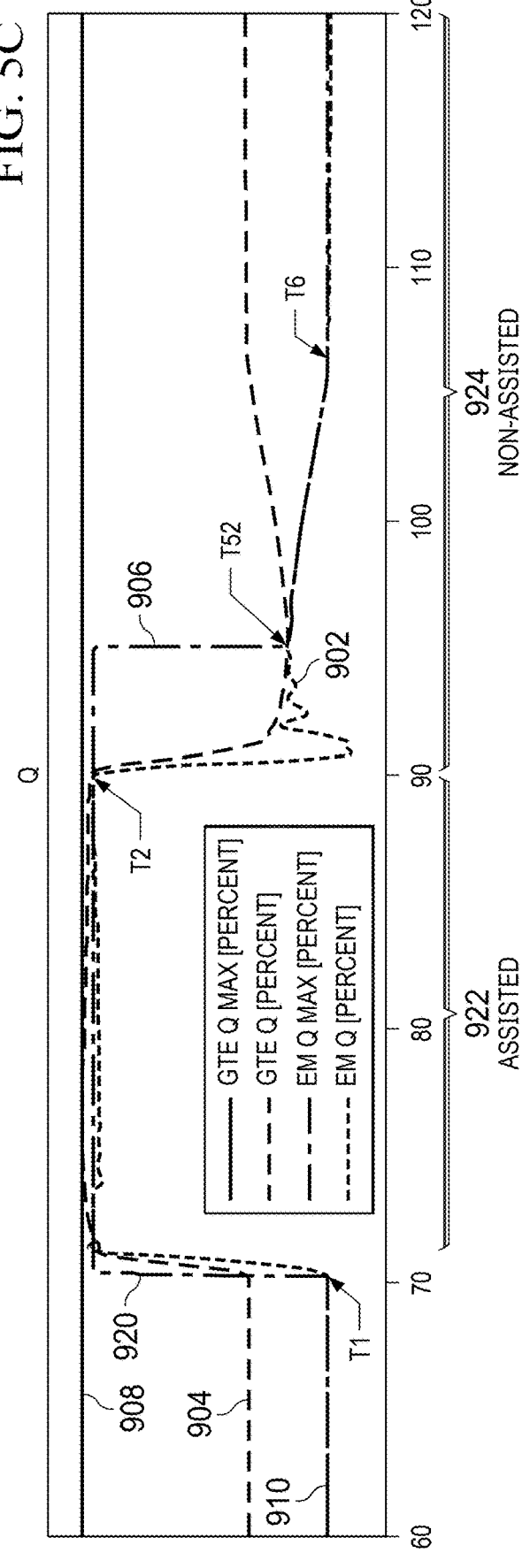
Figures 6A, 6B:
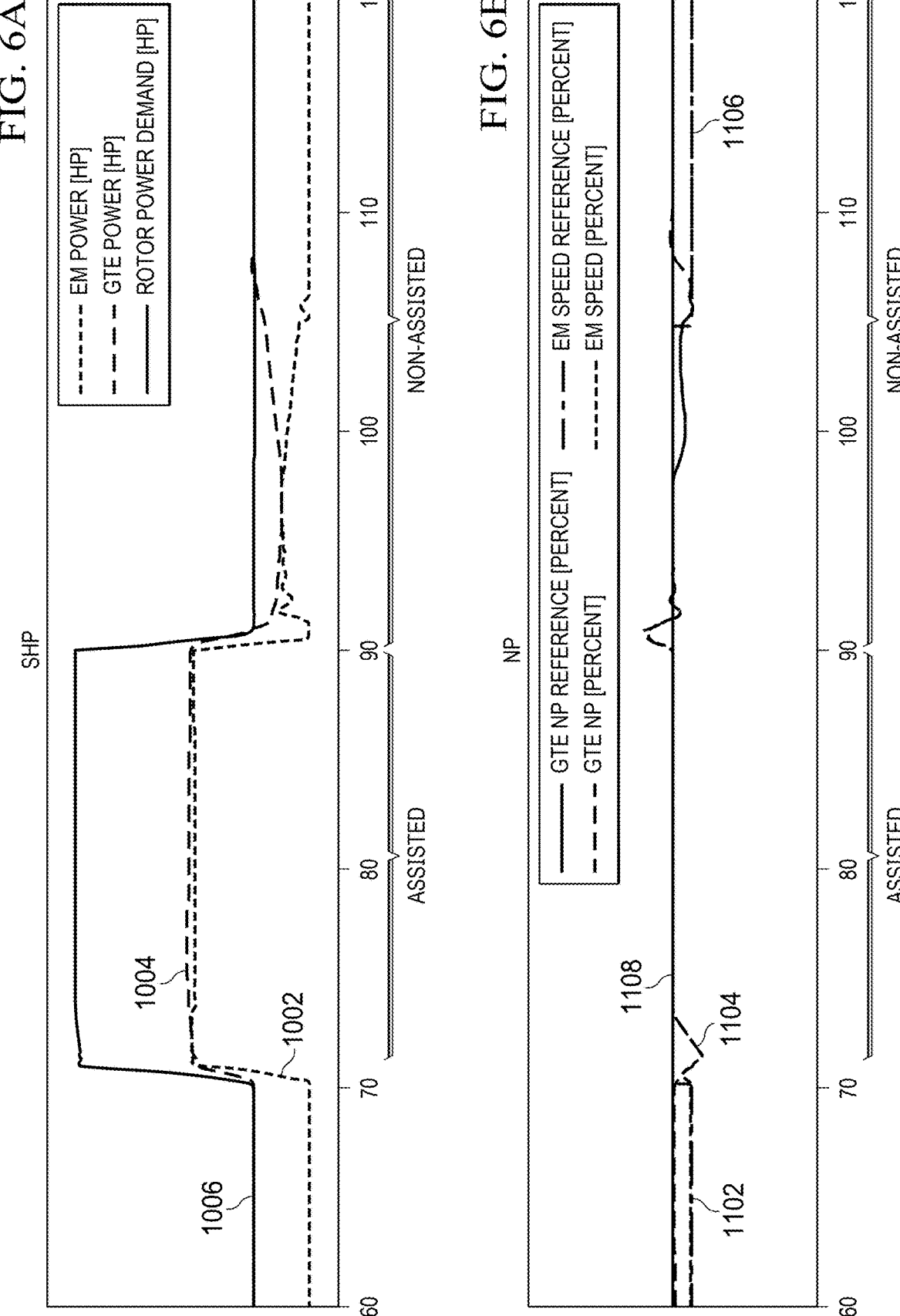
FIGS. 6A, 6B, and 6C respectively illustrate power, speed, and torque responses relative to a period of time during a third simulation of the system of FIG. 3.
Figure 6C:
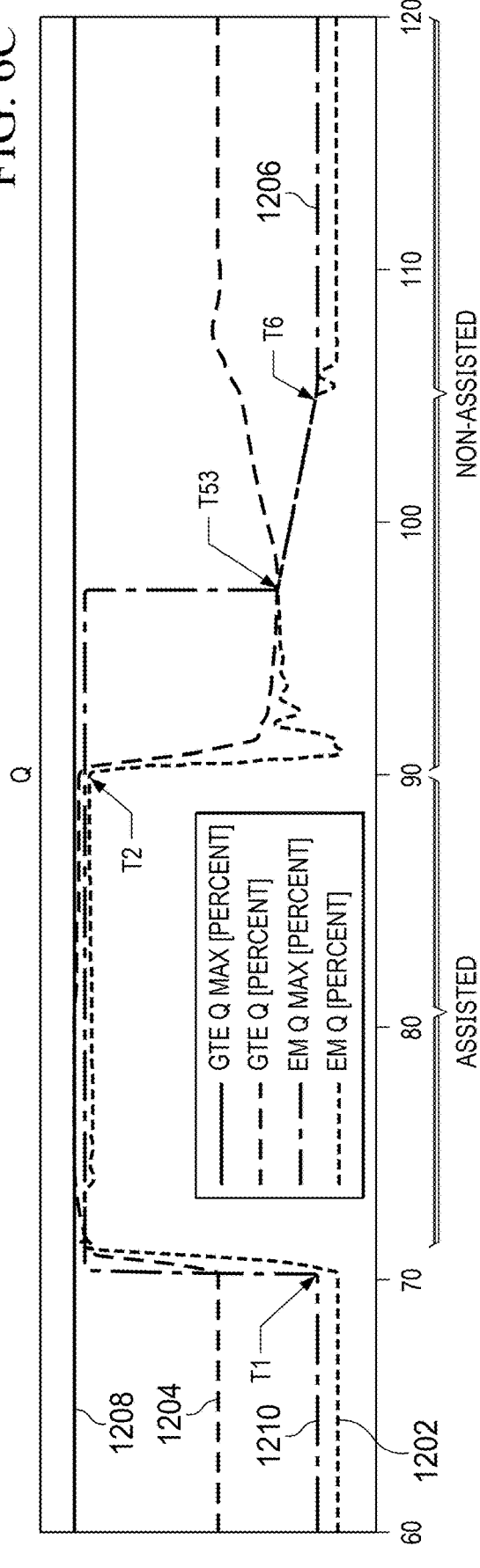
Figures 7A, 7B:
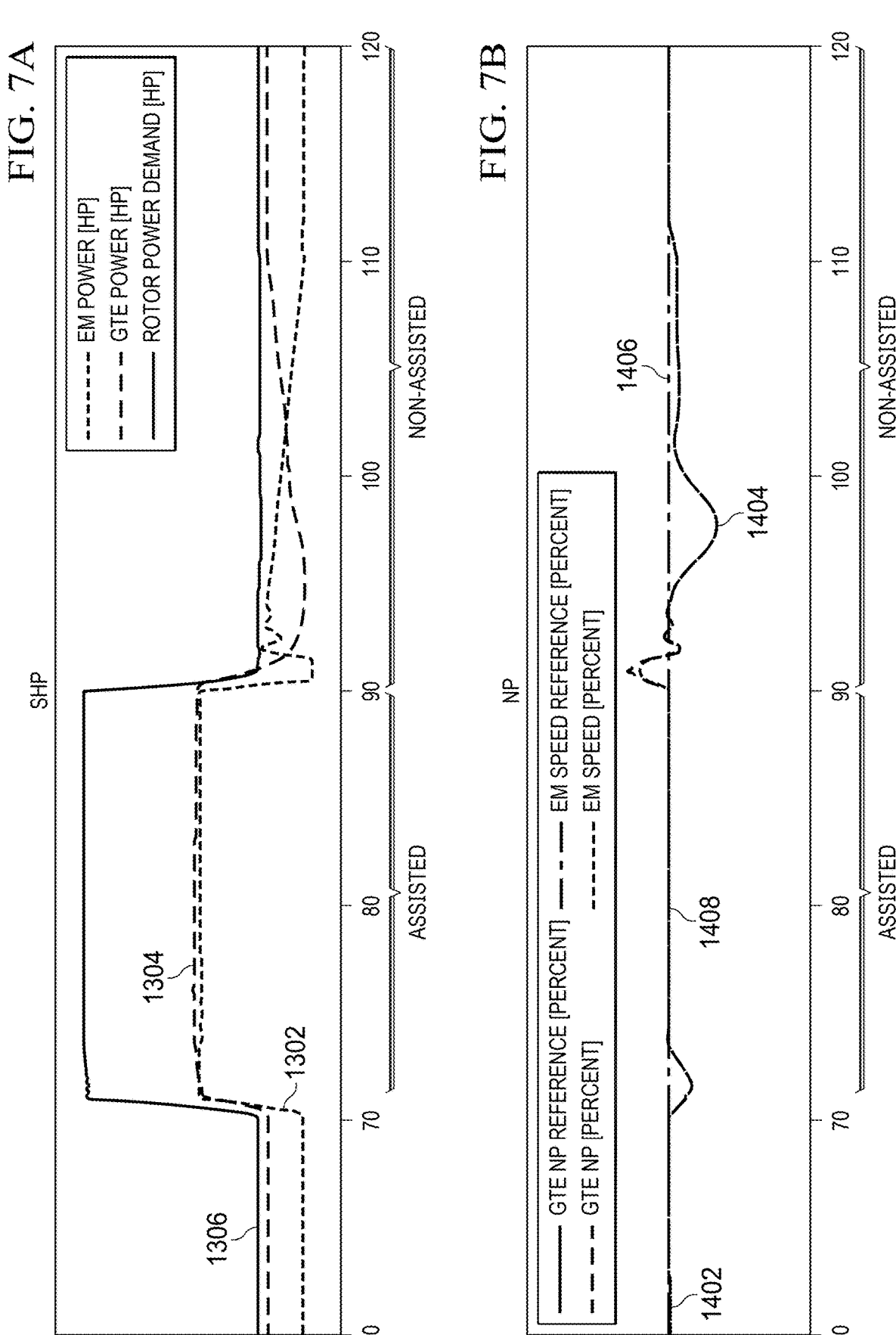
FIGS. 7A, 7B, and 7C respectively illustrate power, speed, and torque responses relative to a period of time during a fourth simulation of the system of FIG. 3.
Figure 7C:
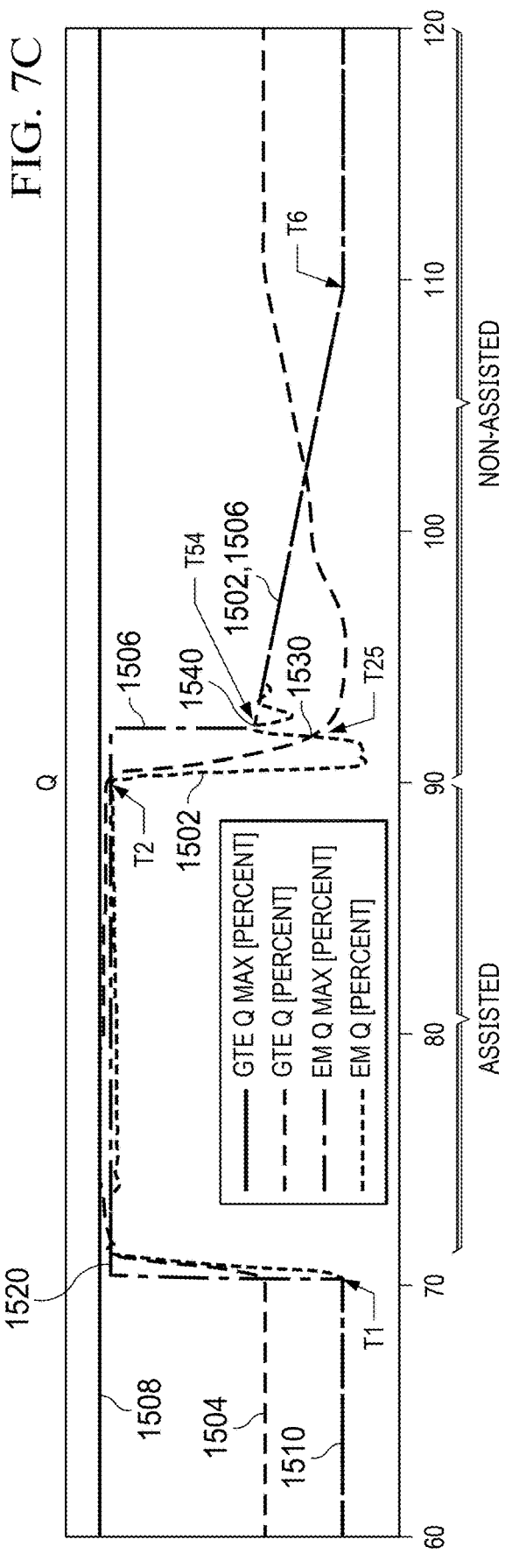

This disclosure provides Scenarios 1-6 to describe the various operations of the system 300. In Scenario 1, the system 300 operates based on a non-assisted determination, as shown in FIGS. 4A, 4B, and 4C (collectively, FIG. 4). In Scenario 2, the system 300 operates based on an assisted determination, as shown in FIGS. 5A, 5B, and 5C (collectively, FIG. 5). In Scenario 3, the system 300 sets a maximum torque command limit in electric motors assisted phase. In Scenario 4, the PT manager 350 relinquishes electric motors assist, thereby causing the system 300 to transition from assisted mode to non-assisted mode, as shown in FIGS. 6A, 6B, and 6C (collectively, FIG. 6). In Scenario 5, the system 300 executes the speed setpoint separation logic 364, as shown in FIGS. 7A, 7B, and 7C (collectively, FIG. 7). In Scenario 6, the system executes a torque unmatching function 392, described further below.

FIGS. 4A, 4B, and 4C respectively illustrate power, speed, and torque responses relative to a period of time during a first simulation (Scenario 1) of the system 300 of FIG. 3. The x-axis represents the time domain, including the period of time during the first simulation of the system 300.

In Scenario 1, the pilot of the aircraft performs a first acceleration maneuver at time T1 by changing the CLP angle to accelerate the rotor 308, as such, this first acceleration maneuver is an increase of rotor power demand. Subsequently, the pilot performs a first deceleration maneuver at time T2, at which the pilot drops (for example, changes the CLP angle of) the collective lever in order to reduce rotor load. This change of CLP at T2 is a decrease of rotor power demand. Given that the engine 302 is configured to maintain (for example, prevent or resist a change of rotor speed) rotor speed, the engine 302 responds to this decrease of rotor power demand by reducing (for example, drops) engine torque as an attempt to prevent a change of rotor speed. Also in Scenario 1, the pilot performs a second acceleration maneuver at time T3 followed by a second deceleration maneuver at time T4.

FIG. 4A illustrates system power 400 relative to time, including electric motor power 402, gas-turbine engine (GTE) power 404, and rotor power demand 406. For example, the system power 400 can be measured in horse-power (HP) represented on the y-axis.

The rotor power demand 406 represents the CLP data 324. The rotor load torque (or power) can be determined on the helicopter flight control computer (such as avionics 310) and then sent to the EEC 304 as a power demand signal (rotor power demand 406) over a communication network, or can be computed within the EEC 304 using a pre-determined load map function (such as within the CLP module 324m) of collective, pedal, rotor speed and ambient conditions such as temperature and pressure altitude. The EEC 304 controls a sum of the EM power 402 and the GTE power 404 to match the rotor power demand 406. In some cases, the rotor power demand signal can be inaccurate compared to actual physical rotor power, for example, the EEC 304 can be configured to control the sum of the EM power 402 and the GTE power 404 to aim to be equivalent the rotor power demand 406.

FIG. 4B illustrates system speed 500 relative to time, including electric motor speed 502, GTE speed 504, electric motor speed reference 506, and GTE speed reference 508. For example, the system speed 500 can be measured in percent of capability represented on the y-axis. The electric motor speed 502 represents the NR datum 322 as a reference speed. The GTE speed 504 represents the power turbine rotor speed measurement 316. The electric motor speed reference 506 represents the second command signal 354, which is set to a nominal value 520 (such as 100%) in assisted mode and is set to a higher value 510 (such as 101%) in non-assisted mode. For example, the nominal value 520 can represent the NR datum 322, and the higher value 510 can represent the elevated speed setpoint reference 374. The GTE speed reference 508 represents a selected speed reference 382.

FIG. 4C illustrates system torque 600 relative to time, including electric motor torque 602, GTE torque 604, electric motor torque maximum 606, and GTE torque maximum 608. For example, the system torque 600 can be measured in percent of maximum torque capability represented on the y-axis.

The electric motor torque 602 represents the motor torque measurement 327, for example, torque generated by the motor 306 and output to the rotor 308. The motor torque 602 simulates an actual response by the motor 306 to current commands 334.

The GTE torque 604 represents the GTE torque measurement 314, for example, torque generated by the engine 302 and output to the rotor 308. The GTE torque 604 simulates an actual response by the engine 302 to the fuel flow selection 332 command.

The electric motor torque maximum 606 represents the first command signal 352, which can be the value of the maximum limit 340 for the torque command to the electric motors 306.

The GTE torque maximum 608 represents the maximum torque capability of the engine 302, which can be constant value such as a nameplate value set by a manufacturer of the engine. In this example, the GTE torque maximum 608 is 120%, which can be greater than a continuous torque rating of 100%, and can be associated with a non-continuous period of acceleration.

The first simulation represents operation of the system 300 according to Scenario 1. If the power demand aggregator 362 determines that the engine 302 can meet rotor load 406, then the power demand aggregator 362 sets the maximum torque command limit of the electric motor to a low value. The electric motor torque maximum 606 is set to a low value 610 (for example, approximately 10%) during a non-assisted phase 612 (namely, a period time of operating in the non-assisted mode). The low value is enough to maintain electric motor speed at rotor speed while conserving battery charge of a battery (not shown) that provides power to the electric motor 306. For example, conserving battery change can include minimizing reduction of (for example, not reducing) the SoC of the battery. By setting the maximum torque command limit 340 of the electric motor to a low value, potential speed control loops interaction or coupling issue between electric motors and GTE is also avoided.

Upon satisfying the condition in which the measured speed of the rotor 308 is at its set point (for example, within a tolerance range relative to the set point), the EEC 304 makes a determination of whether to operate in the assisted mode. The procedure that the PT manager 350 executes to make this determination includes a comparing such that: (i) the measured electric motor torque 602 (or measured electric motor power) is less than a threshold or the measured GTE torque 604 (or power); or (ii) rotor load torque (or power 406 of FIG. 4A) is less than measured GTE torque (or power 404 of FIG. 4A); or rotor load torque (or power 406 of FIG. 4A) is less than the GTE rated torque (or power) limit 608.

During the non-assisted phase 612 prior to time T1, in addition to the capability of setting the electric motors maximum torque command limit 606 to the low value 610 during the non-assisted phase 612, the PT manager 350 is also capable of controlling the EPU 312 to operate in a charging generator mode by setting the limit 340 (together with the minimum torque command limit 338) to a negative value to convert the electric motors 306 into operating in a generator mode to charge the batteries (not shown), thereby increasing the value of the SoC data 326.

The determination of entry into generator mode can be based on entry contextual data cockpit switch, aircraft flight or cruise phase, aircraft steady-state operation detection (for example, operation in a cruise mode), gas-turbine power level or difference in its measured torque or inter-turbine temperature from their limits, remaining GTE fuel tank range, battery SoC data 326, battery and/or ambient temperature, or in combination. The negative limit can also be variable based on the above-described contextual data, or proportional or inversely proportional to the contextual data (e.g., to battery state of change or fuel tank range), or in combination. The aircraft steady-state operation detection condition can include using collective, pedal, cyclic and the GTE measure or commanded signals (e.g., rotor speed, torque, temperature, fuel flow) not changing (or rate of change within thresholds) over certain confirmation time(s). The generator mode exit condition can be based on the reverse (or opposite) of the above-listed entry contextual data, aircraft collective, pedal or cyclic movements (e.g., level difference or rate of change), or in combination, or a determination to operate the electric motors 306 in assisted mode.

At time T1, the first acceleration maneuver causes the PT manager 350 to set the maximum torque command limit to the high value 620 in response to detecting (via Power Demand Aggregator 362) that assistance from electric motors 306 is required to mitigate (reduce or minimize) rotor speed droop. During fast collective lever pull or when the GTE is operating at its operating limits (for example, transient limits or steady-state limits), rotor speed droop can potentially occur. Rotor speed droop refers to the decreasing speed of the rotor 308 in relation to the rotor speed datum 322. As an example, transient engine limits are maximum rate of fuel flow change or rate of engine core speed change; and steady-state engine limits are maximum torque or temperature limits. The first acceleration maneuver causes the power demand aggregator 362 to detect that the rate of change of CLP angle exceeds an acceleration/deceleration threshold that triggers the switching of the assisted/non-assisted mode at time T1. Particularly, the power demand aggregator 362 is triggered to switch to operate in assisted mode based on the rate of increase of rotor power demand 406 exceeding the acceleration/deceleration threshold, even though the power demand aggregator 362 concurrently determines that that the engine 302 can meet rotor load based on the GTE power 404 being less than rotor power demand 406.

At time T1, the determination to operate in assisted mode triggers the power demand aggregator 362 to instantaneously switch from non-assisted mode to assisted mode. The system 300 responds to this instantaneous switch from non-assisted mode to assisted mode by briefly operating in a transient-state, as shown by the transient phase. The PT manager 350 executes a procedure for setting maximum torque command limit (i.e., electric motor torque maximum 606) during the assisted phase 622. An instantaneous switch from the low value 610 to the high value 620 of electric motor torque maximum 606 causes the motor torque 602 to rapidly accelerate to a peak, and then settle into a steady state during the assisted phase 622. During this assisted phase 622, the measured GTE torque 604 is less than the GTE torque maximum 608 and less than the high value 620, thereby causing the EPU 312 to operate the motor 306 at the low value 610 of torque even though the PT manager 350 allows the motor to operate at a high value 620.

The procedure that the PT manager 350 executes to determine whether to operate in the assisted mode can generate a determination result based on rate of change of CLP angle or load torque/power demand signal or GTE outer speed control loop request exceeding a threshold, rotor speed droop level, rotor speed reference, difference in measured GTE torque and its maximum torque limit, difference in GTE inter-turbine temperature and its maximum inter-turbine temperature limit, rotor torque demand exceeding GTE torque limit reference or computed GTE torque limit corresponding to the inter-turbine temperature (as function of powerplant inlet temperature, altitude, etc.) or maximum rated take-off power (as function of powerplant inlet temperature, altitude, etc.), GTE transient limiting is active (e.g., measured rate of change of fuel flow is within rate of change of fuel flow limit reference); or combination of the aforementioned conditions.

The conditions to allow the PT manager 350 to determine to operate in the electric motor assist mode can also include failure modes of the GTE. For example, detected sensors failures or actuator failures that lead to degraded operation, shutdown, or failing to a fixed fuel flow (such as WF threshold at which a WF measurement represents a failure mode).

In response to a determination to operate in assisted mode, the electric motor torque maximum 606 is set at a higher value 620 (for example, higher than 100%) than the electric motors nominal rated capability in order to not hinder the fast response of the electric motors speed control loop (which fast response is faster than the GTE outer speed control loop) to reduce (for example, minimize rotor speed droop). The electric motor torque maximum 606 can also be set proportional to the battery SoC 326 or inversely proportional to the duration of assisted phase 622 is required (e.g., for prolonging electric motors assist in the event of degraded GTE operation). In other words, the amount to of charge of the battery (SoC data 326) relates to the duration of electric motor assist and amount of power output by the motor.

In some embodiments, this electric motor torque maximum 606 can be in steps (stages) for incremental change between the low value 610 and high value 620. That is the electric motor torque maximum 606 can be temporarily incremented/decremented to a medium value that is greater than the low value 610 and less than the high value 620. For example, the electric motor torque maximum 606 can be set at the high value 620 at initial assist stage due to rapid torque demand detection to minimize rotor speed droop, and then lowered after a pre-determined duration or detection of steady-state operation (e.g., rotor speed remained constant within a threshold at or below the speed set point). The reduction increments of the electric motor torque maximum 606 can also be overridden and set back higher when the GTE operates at its operating limit (measured lower than set operating limit, e.g., torque limit). The transition of the limit levels of the electric motor torque maximum 606 can be rate limited as function of rotor speed droop or rate of change of power demand.

The first deceleration maneuver reduces the rotor power demand 406 to less than the GTE power 404 at time T2, which condition triggers the power demand aggregator 362 to instantaneously switch to non-assisted mode. The system 300 responds to this instantaneous switch to non-assisted mode by transient-state operations, as shown during the transient phase 632.

The second acceleration maneuver increases the rotor power demand 406 beyond the first power level 410 associated with the assisted phase 622 and to a second power level 420. Time T3 refers to the condition in which the power demand aggregator 362 determines that the GTE torque 604 is within a threshold range relative to the GTE torque maximum 608, as shown in FIG. 4C. In some embodiments, EEC 34 controls the engine 302 to operate at a maximum steady-state power limit 430 of the engine when the rotor power demand 406 exceeds or is within a threshold range relative to the maximum steady-state power limit 430 of the engine, as shown in FIG. 4A. In such embodiments, the time T3 also refers to the condition in which the power demand aggregator 362 determines that the rotor power demand 406 is within the threshold range relative to the maximum steady-state power limit 430. Based on this condition at T3, the power demand aggregator 362 switches to the assisted mode, and instantaneously increases the EM maximum torque 606 to the high value 620. Another transient phase 642 occurs. While the rotor power demand 406 is maintained at the second level 420, the GTE torque 604 is at an operating limit (such as the GTE torque max 608) of the engine 302.

The second deceleration maneuver, which is a reversal of the second acceleration maneuver, decreases the rotor power demand 406 from the second level 420 to a baseline demand level 440 (for example, 500 hp) that is less than the first power level 410. As a reverse of the conditions that are referred to as T3, the time T4 refers to the condition in which the power demand aggregator 362 determines that the GTE torque 604 is within a threshold range relative to the GTE torque maximum 608 (as shown in FIG. 4C) and/or determines that the rotor power demand 406 is within the threshold range relative to the baseline demand level 440. The baseline demand level 440 can be a power level 450 equivalent to the load of the rotor 308 when the PT manager 350 operates in the non-assisted mode and the motor 306 operates at the low value 610 (for example, when outputting the minimum torque limit 338 equals to the maximum low torque limit 340).

This disclosure provides a splitting function or torque unmatching 392 so that at steady-state or slower maneuvers, the engine 302 provides as much power as it possibly could up to engine operating limits (for example, maximum torque or temperature) thereby preventing overuse of the electric motors 306, and therefore conserving battery charge. In Scenario 6, the system executes the torque unmatching function 392.

Torque unmatching function 392 can be executed by the EEC 304 by generating an unmatching bias within the GTE speed controller (for example, NP governing loop 390) or directly to speed feedback to cause the GTE speed controller to request more fuel flow and in turn increase engine power. As the engine 302 increases power, the speed controller of the electric motors 306 automatically reduces power to maintain rotor speed. The unmatching bias can be based on (e.g., proportional to) the difference between the measured GTE torque and the total of GTE and electric motors torque (with an optional positive or negative bias and/or multiplier). Additional scaling (multiplier) on unmatching bias can be incorporated; for example, based on rotor speed error.

Alternatively, the torque unmatching function 392 can be included as part of and executed by the EPU 312 that biases the EM speed controller (for example, EM speed loop governor) to reduce torque command during the assisted phase and when measured engine torque or temperature is below engine operating limits (at or by a threshold). This alternative embodiment is shown in FIG. 4C, particularly, the EEC 304 can decrease the EM Q max limit 604 (by the dynamic value) to cause the engine 302 to respond by increasing GTE torque 604.

As another alternative to the torque unmatching function 392, to maximize usage of the engine 302 for providing propulsion, a dynamic torque trim (variable signal) can be generated and subtracted from (or multiplied with) the electric motors maximum torque command limit. This dynamic torque trim can be activated at the lowered step stage. When activated, this dynamic torque trim will lower the electric motors maximum torque command limit until the GTE reaches one of its controlled limits (e.g., difference between measured torque/temperature and limit setpoint within a threshold) or rotor speed drooping below its reference by a threshold. The dynamic torque trim can be generated using an integrator that stop integrating upon reaching gas-turbine power limits or rotor speed drooping, and reset to an initial value (e.g., zero) when rotor load torque increases or when exiting to electric motor non-assisted phase. The input to the integrator can be the difference between rotor load torque and GTE torque, with a bias, and a gain to adjust the rate of integration.

FIGS. 5A, 5B, and 5C respectively illustrate power, speed, and torque responses relative to a period of time during a second simulation (Scenario 2) of the system 300 of FIG. 3. To avoid duplicative descriptions, the electric motor power 702, GTE power 704, rotor power demand 706, and baseline power 740 of FIG. 5A can be similar to corresponding features 402, 404, 406, and 440 of FIG. 4A. The power level 710 of FIG. 5A can be similar to the second power level 420 of FIG. 4A. The electric motor speed 802, GTE speed 804, electric motor speed reference 806, and GTE speed reference 808 of FIG. 5B can be similar to corresponding features 502, 504, 506, and 508 of FIG. 4B. The electric motor torque 902, GTE torque 904, electric motor torque maximum 906, GTE torque maximum 908, low value 910, and high value 920 of FIG. 5C can be similar to corresponding features 602, 604, 606, 608, 610 and 620 of FIG. 4C.

In Scenario 2, the pilot of the aircraft performs a first acceleration maneuver at time T1 followed by a first deceleration maneuver at time T2, which is similar to the times T1 and T2 of Scenario 1. The condition for exiting assisted mode (and time T2 of switching to the non-assisted mode), which is when assistance from the motor 306 can be relinquished, is determined as described above. At time T2, the PT manager switches from the assisted phase 922 to the non-assisted phase 924. In Scenario 2, the PT manager 350 executes a procedure for relinquishing assistance from the electric motors 306 to reduce (for example, minimize) an excursion of the speed of the rotor, and more particularly, the QEM maximum limit scheduler 368 reduces the electric motor torque maximum 906 based on a pre-defined rate limit. The procedure for relinquishing assistance enables the PT manager 350 to instantaneously switch from non-assisted mode to assisted mode, and to switch the electric motor torque maximum 906 from the high value 920 to the low value 910 in a non-instantaneous manner over a transitional relinquishing period from T2 to time T6.

In response to the determination to operate in non-assisted mode, the PT manager 350 is configured to reduce the electric motors maximum torque command limit 352 back down to a minimum level in a manner that minimizes rotor speed excursions (such as droop or overspeed) in concert with the lowering of power of the GTEs. For example, the electric motor torque maximum 906 is reduced back down to the low value 910 at T6, and the PT manager 350 reduces rotor speed excursions during the transitional relinquishing period from T2 to time T6. A drastic reduction of electric motors torque may cause high rotor speed droop, and too gradual reduction of electric motors torque may deplete the battery charge. To mitigate, PT manager 350 contains a Minimum Droop Electric Motors Unloading function 366 to schedule the lowering of the electric motors maximum torque command limit. That is, the Minimum Droop Electric Motors Unloading function 366 implements a tradeoff (such as a balance) between high excursion of speed and a drastic reduction of electric motors torque, which is a tradeoff between longer time to avoid an undesired consequence and shorter time to achieve desired fast response.

In some embodiments, the Minimum Droop Electric Motors Unloading function 366 incorporates a decreasing rate limit, such as the pre-defined rate limit. In order to maintain rotor speed governing preventing overspeed, and considering that the speed control dynamics of the electric motors respond faster than the GTE 302, the electric motor speed control loop will reduce its torque request much faster than the GTE 302 during a reduction in power demand, for example, during the first deceleration maneuver at time T2. In response to the first deceleration maneuver, the GTE 302 reduces the GTE power 704, which reduction is potentially limited by a deceleration capability (e.g., rate of change of core speed spool down) of the engine 302, and as a result, the PT manager 350 is configured to reapply 730 torque from the electric motors 306 to maintain rotor speed. As an example of the rotor speed excursion, a sudden reduction 720 of the GTE power 704, as shown in FIG. 5A, causes the motor 306 to reapply 730 a sudden increase of motor power 702, which is also shown in FIG. 5B as a sudden increase of electric motor speed 802 to a high peak. As another example, the Minimum Droop Electric Motors Unloading function 366 mitigates rotor speed excursion, maintaining the motor speed 802 at or less than a low value 810 that is within a droop-avoidance range, as shown in FIG. 5B.

The time T52 refers to a condition in which torque difference between 902 and GTE torque 904 is within a threshold. In this example, the threshold can be defined such that the torque difference between EM torque 902 and 904 is zero, but the threshold can be a non-zero value. At the moment T52 that torque or power balances out between electric motors and GTE, the electric motors maximum torque command limit 906 can be reduced to match the measured EM torque 902 (and optionally, reduced with an additional torque bias) and then further decreased at the pre-defined rate limit, which maintains rotor speed droop within a small level (such as less than or equal to the low value 810 of FIG. 5B) until the maximum torque command limit 906 reaches the low value 910 that is an non-assisted level. The measured TM torque 902, at which time T52 the scheduler 368 applies the pre-defined rate limit, can be referred to as a medium value associated with incremental reduction of the maximum torque command limit 906. The time T6 refers to a condition in which the electric motor torque maximum 906 is equivalent to the low value 910. For example, the Minimum Droop Electric Motors Unloading function 366 commences to apply the pre-defined rate limit at time T52 and ceases such application at time T6.

This disclosure provides solutions in Scenarios 3, 4, and 5 to mitigate rotor speed excursion in case the reapplication 730 causes measured EM torque to exceed the measured GTE torque. As one solution, FIGS. 6A, 6B, and 6C respectively illustrate power, speed, and torque responses relative to a period of time during a third simulation of the system 300 of FIG. 3. FIGS. 6A, 6B, and 6C show a solution that instead of applying the pre-defined rate limit at the time T2 of an instantaneous switch to non-assisted mode, the PT manager 350 applies the pre-defined rate limit in response to a determination that the measured EM torque stopped increasing (for example, rate of change is less than a threshold value or substantially zero slope for a sliding window of time). In Scenario 3, the PT manager 350 does not use a threshold to control a torque difference between 1202 and 1204. FIG. 6C shows that the torque command limit 1206 can be initially (at time T53) set at the measured EM torque 1202 and subsequently set to the low value 1210 (i.e., a plateau) of electric motors measured torque.

FIG. 6B shows addition features of the speed setpoint separation logic 364, that can also set the EM speed setpoint 342 at different levels, based on the obtained the assisted 922 and non-assisted mode.

During the non-assisted phase 924, the electric motors speed setpoint can be set less than a nominal rotor speed setpoint (such as NR datum 324) to decouple the electric motors 306 from the rotor 308 main gearbox (removing any potential interactions between the electric motors and GTE speed controllers); or set greater than the nominal rotor speed setpoint to ensure the electric motors 306 are maintained at the low value 1210 of the maximum torque command limit 1206—maintaining a coupled state between the electric motors 306 and the rotor 308 main gearbox.

In assisted phase 922, the electric motors speed setpoint can be set to the nominal rotor speed setpoint, or slightly less than the nominal rotor speed setpoint so that electric motors maintain a small rotor speed droop as GTE reaches its transient or steady-state operating limits-which also could potentially remove any interaction between the electric motors and GTE speed controllers. The GTE speed setpoint is maintained constant at the nominal rotor speed setpoint throughout.

The moments of switching electric motors speed setpoint 342 can be aligned with the assisted and non-assisted phase detection (for example, T1 and T2), or can be offset to align with the start or end (for example, T53 and T6) of the maximum electric motors torque command limit rate limited decrease.

To avoid duplicative descriptions, the electric motor power 1002, GTE power 1004, and rotor power demand 1006 of FIG. 6A represent corresponding features 402, 404, and 406 of FIG. 4A. The electric motor speed 1102, GTE speed 1104, electric motor speed reference 1106, and GTE speed reference 1108 of FIG. 6B represent corresponding features 502, 504, 506, and 508 of FIG. 4B. The electric motor torque 1202, GTE torque 1204, electric motor torque maximum 1206, GTE torque maximum 1208, low value 1210, and high value 1220 of FIG. 6C represent corresponding features 602, 604, 606, 608, 1210 and 1220 of FIG. 4C.

As another solution, FIGS. 7A, 7B, and 7C respectively illustrate power, speed, and torque responses relative to a period of time during a fourth simulation (Scenario 4) of the system 300 of FIG. 3. Instead of applying the pre-defined rate limit at the time T53 that the measured EM torque 1502 stopped increasing, FIG. 7C shows that the PT manager 350 applies the pre-defined rate limit when the EM torque 1502 increases to a specified value 1540 greater than GTE torque 1504. FIG. 7C shows that the torque command limit 1506 can initially be set to a value 1540 that is double (such as a multiple or integer multiple) of the measured torque value 1530 (and optionally, with an additional torque bias) at which the EM torque 1502 and GTE torque 1504 intersect, followed by the pre-defined rate limited decrease as shown in FIGS. 7A-7C.

As an example, the time T25 refers to a condition in which the EM torque 1502 and GTE torque 1504 are equal to each other. The measured torque value 1530 at time T25 is approximately 20% in this example, and as a result, the value 1540 is approximately 40%. The PT manager 350 applies the pre-defined rate limited decrease at time T54, based on a determination that the motor torque 1502 is equivalent to the value 1540. The pre-defined rate limit is applied over the period from T54 to T6, until the electric motor torque maximum 1506 is reduced back down to the low value 1510.

To avoid duplicative descriptions, the electric motor power 1302, GTE power 1304, and rotor power demand 1306 of FIG. 6A represent corresponding features 402, 404, and 406 of FIG. 4A. The electric motor speed 1402, GTE speed 1404, electric motor speed reference 1406, and GTE speed reference 1408 of FIG. 6B represent corresponding features 502, 504, 506, and 508 of FIG. 4B. The electric motor torque 1502, GTE torque 1504, electric motor torque maximum 1506, GTE torque maximum 1508, low value 1510, and high value 1520 of FIG. 6C represent corresponding features 602, 604, 606, 608, 610 and 620 of FIG. 4C.

Figures 8A, 8B:
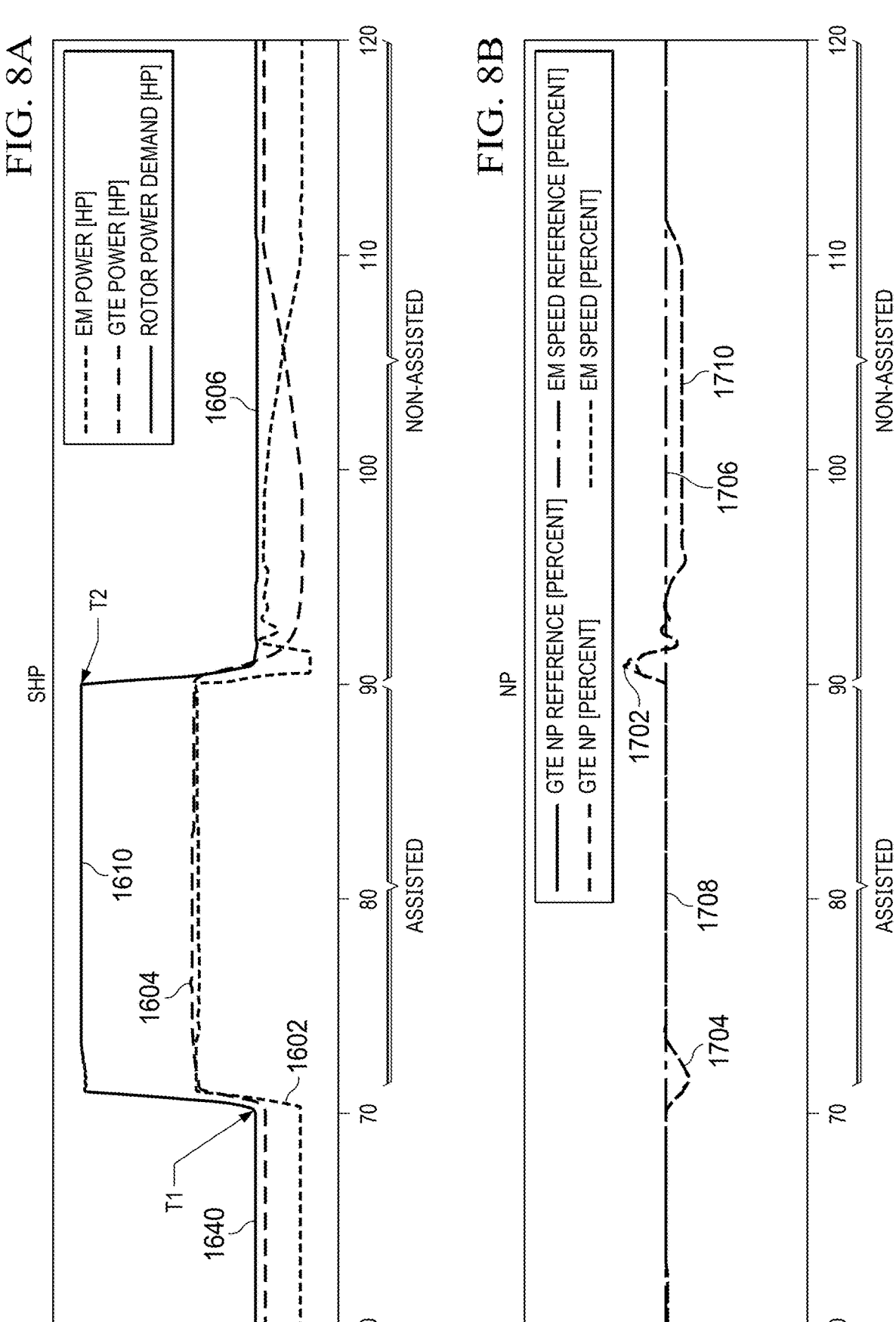
FIGS. 8A, 8B, and 8C respectively illustrate power, speed, and torque responses relative to a period of time during a fifth simulation of the system of FIG. 3.
Figure 8C:
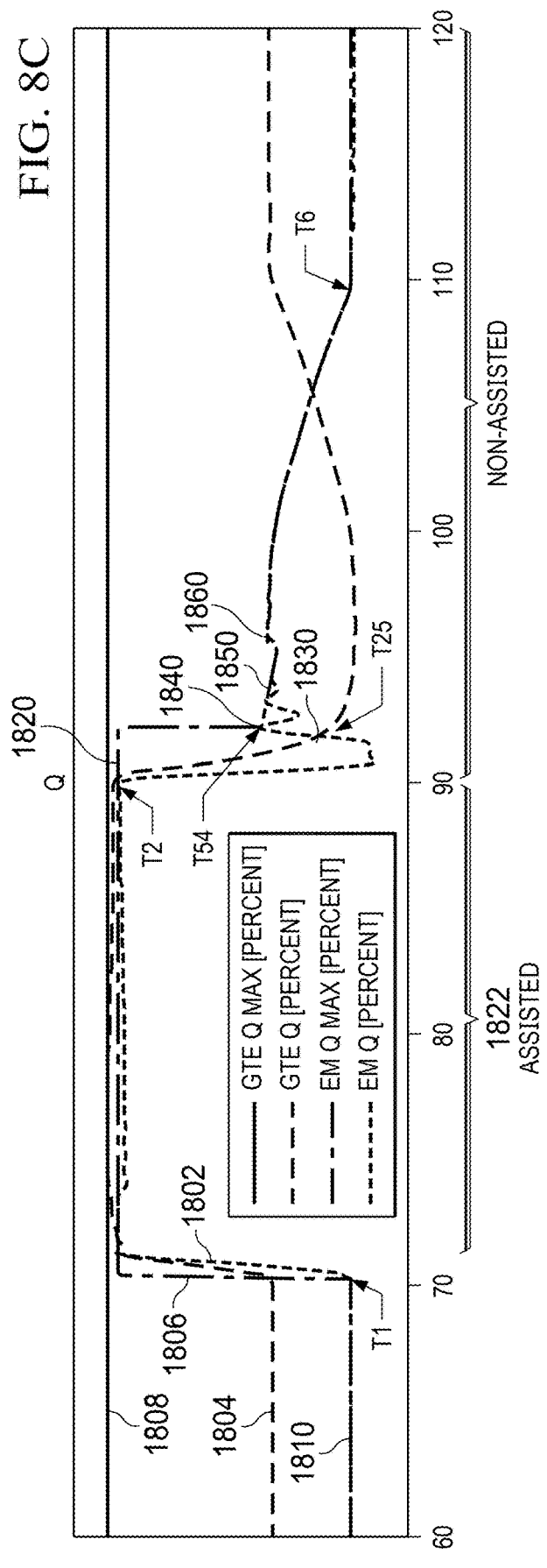

FIGS. 8A, 8B, and 8C respectively illustrate power, speed, and torque responses relative to a period of time during a fifth simulation (Scenario 5) of the system 300 of FIG. 3. As an enhancement, FIGS. 8A-8C show that during the rate limited decrease, the rate limited EM maximum torque command limit 1506 is further augmented to inversely follow the profile (such as concurrently mirroring an inverse of the slope) of the GTE power 1604 as the engine recovers to meet (for example, supply torque to) much of the rotor load while the electric motor 306 returns to the low value 1510 non-assisted torque. This maintains rotor speed excursion from reference within a desired level by momentarily overriding higher the original rate limited decrease. For example, FIGS. 8A-8C show a technique to augment the maximum torque command limit 1206, including to select a maximum from among the pre-defined rate limit and another augmenting torque limit (for example, a bump up or increase of the EM torque, in order to start mirroring at double the level of the intersection). This augmenting torque limit is based on the difference between the power at the start T54 of applying the rate limit decrease (for example, defined as double the measured torque) and measured gas-turbine power (converted to torque via measured speed), with an adder or a multiplier as function (e.g., look-up table) of rotor speed error from reference. The shaping of the adder or multiplier defines the desire level of rotor speed excursion.

FIG. 8B shows that the Minimum Droop Electric Motors Unloading function 366 mitigates rotor speed excursion, maintaining the motor speed 1702 at or less than a predetermined rotor speed excursion limit 1710.

FIG. 8C shows that the power demand aggregator 362 exits the assisted phase 1722 and switches to non-assisted mode at time T2. Subsequently, the power demand aggregator 362 detects that the EM torque 1802 intersects the GTE torque 1704 at time T25 and at measured torque value 1830 (same as 1530 of FIG. 7C). When the EM torque 1802 has increased to the value 1840 (such as double the torque value 1830) at time T54, the QEM max limit scheduler 368 instantaneously reduces the EM torque maximum 1706 from the high value 920 to the value 1840 (same as 1540) and selects the greater from among the pre-defined rate limit 1850 and the augmenting torque limit. In this example, the augmenting torque limit 1860 is a concurrent mirroring function, namely, an inverse of the measured GTE power torque 1804. In other embodiments, the augmenting torque limit 1860 can be a different mirroring function. In this example, during the period from T54 to T6 and increase of the EM torque maximum 1706 toward the augmenting torque limit 1860 shows a switch in which the QEM max limit scheduler 368 selects the pre-defined rate limit 1850 for an initial portion of the rate limited decrease, and selects augmenting torque limit 1860 for a remaining portion.

To avoid duplicative descriptions, the electric motor power 1602, GTE power 1604, and rotor power demand 1606 of FIG. 16A represent corresponding features 402, 404, and 406 of FIG. 4A. The baseline power level 1640 and first power level 1610 of the rotor power demand 1606 of FIG. 8A are the same in Scenarios 3, 4, and 5, and can be added to FIGS. 5A, 6A, and 7A. The electric motor speed 1702, GTE speed 1704, electric motor speed reference 1706, and GTE speed reference 1708 of FIG. 6B represent corresponding features 502, 504, 506, and 508 of FIG. 4B. The electric motor torque 1802, GTE torque 1804, electric motor torque maximum 1806, GTE torque maximum 1808, low value 1810, high value 1820, and assisted phase 1822 of FIG. 8C represent corresponding features 902, 904, 906, 908, 910, 920, 922, and 924 of FIG. 5C.

FIG. 9 illustrates a method for managing electric motor propulsion command limits on a hybrid rotorcraft in accordance with this disclosure. For ease of explanation, the method 1900 will be described as being performed using the computing system 200 of FIG. 2 within the aircraft 100 of FIG. 1. However, the method 1900 may be performed using the variable torque limit control system 300 of FIG. 3, or any other suitable device(s) or systems(s).

At block 1910, the processing device 202 can receive inputs from an engine 302, electric motor 306, rotor 308, and avionics 310. The received inputs can include a torque load demand (for example, CLP data 324, 406, 706, 1006, 1306, and 1606) associated with the rotor 308, first measurements 314-318 from the GTE 302, and second measurements from an electric motor 306. The torque load demand can be digitally calculated or an analog sensor measurement, for example collective lever pitch which is then converted to torque load demand via a rotor load map. The first measurements can include a GTE power measurement (for example, 404, 704, 1004, 1304, and 1404).

At block 1920, the processing device 202 can determine whether the torque load demand is within operating limits of the GTE without assistance from a motor, based on the first measurements compared to a condition for operating in an assisted mode. In other words, the processing device 202 can determine whether the torque load demand is outside of the operating limits of the GTE and requiring assistance from a motor, based on the first measurements compared to a condition for operating in an assisted mode. The condition for operating in an assisted mode includes a determination that the torque load demand exceeds steady-state operating limits of the engine or exceeds transient-state operating limits of the engine, as shown in Scenario 1. The condition for operating in the assisted mode is not satisfied based on: the torque load demand not exceeding a steady-state operating limit of the engine; and a rate of change of the torque load demand exceeding a transient operating limit of the engine. In response to a determination that the condition for operating in assisted mode is not satisfied, the method 1900 proceeds to blocks 1930 and 1940 to operate in non-assisted mode. In response to a determination that the condition for operating in assisted mode is satisfied, the method 1900 proceeds to blocks 1950 and 1960 to operate in assisted-mode.

At blocks 1930 and 1940 and at blocks 1950 and 1960, the processing device 202 can generate and output a first command signal 352 that sets a motor torque limit 340, and a second command signal 354 that sets a motor speed reference value 342 based on a difference between the torque load demand and the GTE power measurement. At blocks 1930, the processing device 202 can generate and output the first command signal 352 that sets a motor torque limit 340, and block 1930 includes the procedures of blocks 1932 and 1934. At block 1932, the processing device 202 can set the motor torque limit 340 to the low value (for example, EM minimum torque limit 338), which is great enough to maintain a minimum limit of electric motor rotor speed and while not reducing a state of change of a battery that provides power to the electric motor. This low value is set before the first acceleration maneuver. At block 1934, the processing device 202 can reduce the motor torque limit from a high value to the low value, for example, by executing a procedure for relinquishing assistance.

This disclosure provides multiple examples of the procedure for relinquishing assistance. For example, block 1934 can include reducing the motor torque limit from the high value to the low value at an instantaneous rate, as described with Scenario 1. As another example, block 1934 can include blocks 1935, 1936, and 1937, as described with Scenarios 2, 3, and 4. As another example, block 1934 can include blocks 1938 and 1939, as described with Scenario 5.

At block 1935, the processing device 202 can determine a medium value that is greater than the low value and less than the high value. In Scenario 2, the processing device 202 can determine, as the medium value, a motor torque measurement at a time of satisfying a condition in which a torque difference between the motor torque measurement and a GTE torque measurement is within a threshold. In Scenario 3, the processing device 202 can determine, as the medium value, a motor torque measurement at a time of satisfying a condition in which an increase of the motor torque measurement stops. In Scenario 4, the processing device 202 can determine, as a first motor torque measurement, at a time that a motor torque measurement and GTE torque measurement are equal to each other; and determine the medium value as a multiple (such as double) of the first motor torque measurement.

At block 1936, the processing device 202 can decrement the motor torque limit from the high value to a medium value at an instantaneous rate.

At block 1937, the processing device 202 can reduce the motor torque limit from the determined medium value to the low value at a non-instantaneous rate that is based on pre-defined rate limit. In Scenarios 2-4, the processing device 202 can apply the pre-defied rate limit as the rate of reduction from the medium value to the low value. In Scenario 5, the processing device 202 can apply the pre-defied rate limit while exceeding an augmenting torque limit.

At block 1938, the processing device 202 can select, as the non-instantaneous rate, whichever is greater from among the pre-defined rate limit and an augmenting torque limit.

At block 1939, the processing device 202 can apply the selected rate limit, as the non-instantaneous rate, from the medium value to the low value.

At block 1940, the processing device 202 can generate and output the second command signal 354. At block 1942, to generate the second command signal 354, the processing device 202 can use the speed setpoint separation logic 364 to set the motor speed reference value 354 equal to a speed setpoint 374 of the engine 302. The speed setpoint of the GTE 302 can be based on the difference between the torque load demand and the GTE power measurement.

At block 1950, the processing device 202 can generate and output the first command signal 352. For example, at block 1952, the processing device 202 can increase the motor torque limit from the low value to a high value (for example, high value 620 FIG. 4C), for example, using an instantaneous switch to the high value.

At block 1960, the processing device 202 can generate and output the second command signal 354. At block 1962, to generate the second command signal 354, the processing device 202 can use the speed setpoint separation logic 364 to vary the motor speed reference value 354 to differ from the speed setpoint 374 of the engine 302.

Although FIG. 9 illustrates one example of a method 1900 for managing electric motor propulsion command limits on a hybrid rotorcraft, various changes may be made to FIG. 9. For example, while shown as a series of steps, various steps in FIG. 9 could overlap, occur in parallel, occur in a different order, or occur any number of times. As a particular example, the procedures at blocks 1930 and 1940 could occur in parallel, and the procedures at blocks 1950 and 1960 could occur in parallel.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    receiving a torque load demand associated with a rotor, and a gas-turbine engine (GTE) power measurement among first measurements from a GTE;

determining whether the torque load demand is within operating limits of the GTE without assistance from a motor, based on the first measurements compared to a condition for operating in an assisted mode; and generating and outputting a first command signal that sets a motor torque limit, and a second command signal that sets a motor speed reference value based on a difference between the torque load demand and the GTE power measurement, wherein generating the first and second command signals includes:

setting or reducing the motor torque limit to a low value and setting the motor speed reference value equal to a speed setpoint of the GTE, in response to a determination that the condition for operating in the assisted mode is not satisfied; and increasing the motor torque limit to a high value and varying the motor speed reference value from the speed setpoint of the GTE, in response to a determination that the condition for operating in the assisted mode is satisfied.

2. The method of claim 1, further comprising:

determining that the condition for operating in the assisted mode is satisfied based on the torque load demand exceeding a steady-state operating limit of the engine or a rate of change of the torque load demand exceeding a transient operating limit of the engine.

3. The method of claim 1, further comprising:

determining that the condition for operating in the assisted mode is not satisfied based on:

the torque load demand not exceeding a steady-state operating limit of the engine; and a rate of change of the torque load demand exceeding a transient operating limit of the engine.

4. The method of claim 1, wherein to generate the first command signal, reducing the motor torque limit to the low value comprises:

decrementing the motor torque limit from the high value to a medium value at an instantaneous rate; and reducing the motor torque limit from the medium value to the low value at a non-instantaneous rate that is based on pre-defined rate limit.

5. The method of claim 4, further comprising:

determining, as the medium value, a motor torque measurement at a time of satisfying a condition in which a torque difference between the motor torque measurement and a GTE torque measurement is within a threshold.

6. The method of claim 4, further comprising:

determining, as the medium value, a motor torque measurement at a time of satisfying a condition in which an increase of the motor torque measurement stops.

7. The method of claim 4, further comprising:

determining, as a first motor torque measurement, at a time that a motor torque measurement and GTE torque measurement are equal to each other; and determining the medium value as a multiple of the first motor torque measurement.

8. The method of claim 4, further comprising:

selecting, as the non-instantaneous rate, a greater from among the pre-defined rate limit and an augmenting torque limit, wherein the augmenting torque limit is an inverse of a GTE torque measurement.

9. The method of claim 1, wherein generating the second command signal comprises:

setting the motor speed reference value equal to a speed setpoint of the GTE that is based on the difference between the torque load demand and the GTE power measurement, in response to a determination that the condition for operating in the assisted mode is not satisfied; and varying the motor speed reference value from the speed setpoint of the GTE, in response to a determination that the condition for operating in the assisted mode is satisfied.

10. The method of claim 1, wherein the low value is great enough to maintain a minimum limit of electric motor rotor speed and while not reducing a state of change of a battery that provides power to the electric motor.

11. An electronic device comprising:

at least one processor configured to:

receive a torque load demand associated with a rotor, and a gas-turbine engine (GTE) power measurement among first measurements from a GTE;

determine whether the torque load demand is within operating limits of the GTE without assistance from a motor, based on the first measurements compared to a condition for operating in an assisted mode; and generate and output a first command signal that sets a motor torque limit, and a second command signal that sets a motor speed reference value based on a difference between the torque load demand and the GTE power measurement, wherein to generate the first and second command signals, the at least one processor is further configured to:

set or reduce the motor torque limit to a low value and setting the motor speed reference value equal to a speed setpoint of the GTE, in response to a determination that the condition for operating in the assisted mode is not satisfied; and increase the motor torque limit to a high value and varying the motor speed reference value from the speed setpoint of the GTE, in response to a determination that the condition for operating in the assisted mode is satisfied.

12. The electronic device of claim 11, wherein the at least one processor is further configured to:

determine that the condition for operating in the assisted mode is satisfied based on the torque load demand exceeding a steady-state operating limit of the engine or a rate of change of the torque load demand exceeding a transient operating limit of the engine.

13. The electronic device of claim 11, wherein the at least one processor is further configured to:

determine that the condition for operating in the assisted mode is not satisfied based on:

the torque load demand not exceeding a steady-state operating limit of the engine; and a rate of change of the torque load demand exceeding a transient operating limit of the engine.

14. The electronic device of claim 11, wherein to generate the first command signal, wherein the at least one processor is further configured to:

reduce the motor torque limit to the low value, including to:

decrement the motor torque limit from the high value to a medium value at an instantaneous rate; and reduce the motor torque limit from the medium value to the low value at a non-instantaneous rate that is based on pre-defined rate limit.

15. The electronic device of claim 14, wherein the at least one processor is further configured to:

determine, as the medium value, a motor torque measurement at a time of satisfying a condition in which a torque difference between the motor torque measurement and a GTE torque measurement is within a threshold.

16. The electronic device of claim 14, wherein the at least one processor is further configured to:

determine, as the medium value, a motor torque measurement at a time of satisfying a condition in which an increase of the motor torque measurement stops.

17. The electronic device of claim 14, wherein the at least one processor is further configured to:

determine, as a first motor torque measurement, at a time that a motor torque measurement and GTE torque measurement are equal to each other; and determine the medium value as a multiple of the first motor torque measurement.

18. The electronic device of claim 14, wherein the at least one processor is further configured to:

select, as the non-instantaneous rate, a greater from among the pre-defined rate limit and an augmenting torque limit, wherein the augmenting torque limit is an inverse of a GTE torque measurement.

19. The electronic device of claim 11, wherein to generate the second command signal, the at least one processor is further configured to:

set the motor speed reference value equal to a speed setpoint of the GTE that is based on the difference between the torque load demand and the GTE power measurement, in response to a determination that the condition for operating in the assisted mode is not satisfied; and vary the motor speed reference value from the speed setpoint of the GTE, in response to a determination that the condition for operating in the assisted mode is satisfied.

20. The electronic device of claim 11, wherein the low value is great enough to maintain a minimum limit of electric motor rotor speed and while not reducing a state of change of a battery that provides power to the electric motor.

* * * * *